United States Patent [19]

Hagenbuch

[11] Patent Number: 4,831,539
[45] Date of Patent: May 16, 1989

[54] APPARATUS AND METHOD FOR LOCATING A VEHICLE IN A WORKING AREA AND FOR THE ON-BOARD MEASURING OF PARAMETERS INDICATIVE OF VEHICLE PERFORMANCE

[76] Inventor: LeRoy G. Hagenbuch, 4602 N. Rosemead, Peoria, Ill. 61604

[21] Appl. No.: 874,273

[22] Filed: Jun. 13, 1986

Related U.S. Application Data

[63] Continuation-in-part of Ser. No. 604,739, Apr. 27, 1984, Pat. No. 4,630,227, and Ser. No. 717,042, Apr. 1, 1985.

[51] Int. Cl.$^4$ .............................................. G06F 15/50
[52] U.S. Cl. ............................... 364/449; 364/424.04; 340/988
[58] Field of Search ................. 364/424, 443, 449; 340/52 R, 52 F, 988, 989, 991, 993, 52 D

[56] References Cited

U.S. PATENT DOCUMENTS

| | | | |
|---|---|---|---|
| 3,644,883 | 2/1972 | Borman et al. | 340/991 |
| 3,813,171 | 5/1974 | Teach et al. | 356/152 |
| 3,876,980 | 4/1975 | Haemmig et al. | 340/991 |
| 3,940,630 | 2/1976 | Bergonz | 340/991 |
| 4,009,375 | 2/1977 | White et al. | 340/988 |
| 4,049,961 | 9/1977 | Marcy | 250/202 |
| 4,099,591 | 7/1978 | Carr | 340/988 |
| 4,107,689 | 8/1978 | Jellinek | 343/112 |
| 4,119,900 | 10/1978 | Kremnitz | 318/587 |
| 4,217,588 | 8/1980 | Freeny, Jr. | 340/988 |
| 4,258,421 | 3/1981 | Juhasz et al. | 364/424 |
| 4,263,973 | 4/1981 | Boulais et al. | 172/4.5 |
| 4,299,290 | 11/1981 | Nunes, Jr. | 172/4.5 |
| 4,309,758 | 1/1982 | Halsall et al. | 364/424 |
| 4,350,970 | 9/1982 | Von Tomkewitsch | 340/988 |
| 4,482,960 | 11/1984 | Pryor | 364/424 |
| 4,490,798 | 12/1984 | Franks et al. | 364/550 |
| 4,500,970 | 2/1985 | Daemmer | 364/513 |

FOREIGN PATENT DOCUMENTS

| | | |
|---|---|---|
| 493628 | 9/1977 | Australia . |
| 0060074 | 9/1982 | European Pat. Off. . |
| 2400447 | 11/1971 | France . |
| 8405278 | 10/1985 | France . |
| WO83/04451 | 12/1983 | PCT Int'l Appl. . |
| 1215275 | 12/1970 | United Kingdom . |
| 2025185 | 1/1980 | United Kingdom . |

OTHER PUBLICATIONS

"5th Wheel" Catalog Sheet by Structural Instrumentation, Inc.
Advertisement in "Chillon's IAN Instrumentation & Control News, vol. 33, No. 12, Burr-Brown's Multibus"-Compatible Analog Input Board, Dec., 1985.
"Optodata ® 5200, The Cable Eliminator" Sales Literature by Scientific Technology, Inc., Including Master Price List.
Catalog Listing Telxon Portable Bar Code Scanners, Telxon Corporation.
(List continued on next page.)

Primary Examiner—Gary Chin
Attorney, Agent, or Firm—Leydig, Voit & Mayer

[57] ABSTRACT

A system is disclosed for identifying the location of a vehicle, assemblying data related to vehicle performance and correlating the assembled data with vehicle location. From the correlation of data and location, a data base is generated that provides information for monitoring performance of the vehicle, reporting irregularities in the performance and generating control signals for commanding vehicle movement. The system comprises a plurality of signposts located at intended destinations of a vehicle, wherein each signpost is characterized by indicia that are distinctive to the associated destination. On board each vehicle is a device for detecting a signpost when the vehicle is within a predetermined proximity of it. The device generates data indicative of the location of the vehicle in response to detection of a signpost. Also on board each vehicle are sensors for collecting and recording data indicative of vehicle performance. The location and performance data are correlated to provide a data base for use by a computer in monitoring the vehicle performance, reporting irregularities in the performance and locating the vehicle and controlling the movement of the vehicle.

19 Claims, 14 Drawing Sheets

OTHER PUBLICATIONS

Article "Bar Codes Hold 'Patent' on Document Tracking" in Automatic I.D. News, Sep., 1986.

The Argo FMS 1330 "Report Card" Marketing Brochure Describing the Argo Fleet Management Systems.

"The VMS TM–Setting New Standards for Vehicle Monitoring", publication by GLI Corp. of Woodinville, WA, published Dec. 1985.

Article on "Modems Take to the Airwaves" by M. David Stone, published in PC Magazine, Jan. 14, 1986, pp. 184–193.

A. H. Emery "Hytronic Totalizer" catalog sheet, Bulletin 2911, Dec. 5, 1985.

The "OEM-Bus Single Board Computer SYS-2Z" catalog sheets by The Robasic Corporation.

"Construction Vehicle ID Transmitter for Carriage Data Collection & Management System" by Sumitomo Electric Ind. Int'l Cong. & Expo, Detroit, MI, Feb.–Mar. 1985.

Cost Savings Bulletin I describing "VMS TM As a Preventive Maintenance Tool" dated Jan. 13, 1985.

Cost Savings Bulletin II describing "VMS TM As A Preventive Maintenance Tool" dated Sep. 6–8, 1985.

Cost Savings Bulletin III describing "VMS TM As A Preventive Maintenance Tool" dated Dec. 28–29, 1985.

Advertisement by Identification Devices, Inc., Boulder, CO, on the System I.D. ® Automated Vehicle Identification. Date Unknown.

Article on the AVM (Automatic Vehicle Monitoring) and AVL (Automatic Vehicle Location) Systems, pub. in Mobile Radio Technology; Sep. 1985, pp. 64–65.

Article in Design News entitled "Automatic Vehicle Locator 'On-The-Air'", Sep. 23, 1985, p. 29.

Brochure entitled "Automatic Vehicle Locator System" © by Motorola, Inc., 1984.

"Satellites Add More Accuracy To Locating Objects On Earth" article by D. Wessel, Staff Reporter of The Wall Street Journal. Date Unknown.

Advertisement by the Hawker Siddeley Dynamics Engineering Ltd. in The Mining Engineer for Mining Controls Capabilities, p. 332, date unknown.

Advertisement by Hawker Siddeley Dynamics Engineering Ltd. on the "Elements of An MVMM System".

"Dynalink Mine Vehicle & Material Management System", Publication No. BSL 924, Issue No. 01, by Hawker Siddeley Dynamics Engineering Ltd., HSDE 1986.

"Fully Integrated Truck Information & Control Systems (TIACS)" by T. O. Jones & W. K. Tsuha, SAE Technical Paper Series, Truck & Bus Expo, Cleveland, OH, Nov. 7–10, 1983.

Article on AGV (Automated Guided Vehicle) Marketed by Caterpillar Co. Along With General Electric Co. of Great Britain. Publication Unidentified.

"Car 54, Where Are You? Just Check the Computer Map" Article in Business Week, Science & Technology Section, Aug. 12, 1985.

"Eye In Sky Will Keep Us From Getting Lost" article by John Hillkirk in USA Today, Mar. 5, 1986.

"Truck Management Systems Review" by V. Srajer, Canmet (Canada Centre for Mineral & Energy Technology) Calgary Coal Research Laboratory, Dec., 1985.

"Vehicle Monitoring System For Large Off-Highway Trucks", article of GLI Corp. in Mining Journal, Jan. 10, 1986.

"An Integrated Truck Management Information System (Truck MIS) Concept" Article by LeRoy G. Hagenbuch presented at CIM 2nd Dist. 5 Mtg. on Sep. 11, 1985.

"Analysis of Open-Pit Truck Haulage System by Use of a Computer Model" by J. H. Tu & V. J. Hucka of Univ. of Utah, in the CIM Bulletin, Jul., 1985, pp. 53–60.

E-ZTRAC TM Truck Tracking System © 1984–Computer Program Written in COBOL Which is A Unique Tracking System Designed Specifically for the Ready Mixed Concrete Industry.

Article by SPEEDCALL Corporation Entitled "Fleet Dispatch and Control Systems", Copyright 1984.

A Brochure entitled "Automatic Truck Dispatching and Identification System", Gould, Inc., Information Identification Division, Sep. 1980.

A Brochure for Motorola's "Automatic Vehicle Location System"; Copyright 1984.

Marcelo, Ben; "Selecting The Right Automatic Vehicle Location System"; Magnavox (no date).

Brochure entitled "The Answer To Increased Dispatch (List continued on next page.)

OTHER PUBLICATIONS

Efficiency," by The Alkon Corp., Columbus, Ohio; © 1985.

Harrington, L. H.; "Money-Saving Software," Traffic Management, Cahners Publishing Company, Apr. 1986.

Himebaugh, A. E.; "Computer-Based Truck Dispatching In The Tyrone Mine," Mining Congress Journal, Nov. 1980; pp. 16-21.

Arnold et al., "Computer Dispatching Improves Open Pit Mining Efficiency" Presented at American Mining Congress Int'l. Mining Show, Las Vegas, NV; Oct. 5-9, 1986.

Riley et al., "Vehicle Tracking System for Salem, Oregon Police Dept." The Institute of Navigation, Proceedings of the National Technical Meeting, 1/21-23/86; pp. 89-94.

Brochure entitled "LASER NET TM -The Smart Sensor", Namco Controls, Mentor, Ohio; ©Apr., 1986.

Kaneno et al., "Construction Vehicle ID Transmitter For Carriage Data Collection And Management System," SAE Technical Paper Series, Int'l Congress and Expo, Detroit, Mich.; Feb. 25-Mar. 1, 1985; pp. 29-41.

Cotton et al., "Toronto Transit Commission Communications And Information System Evaluation of Operation Tests," 30th Annual Conference Of The IEEE Vehicular Technology Society; Bohn Printing Co., Utica, Michigan; Sep. 15-17, 1980.

KEY TO FIGURES $T_1$ = 1ST TYPE OF VEHICLE
$T_2$ = 2ND TYPE OF VEHICLE
$L_1$ = 1ST LOADING AREA
$L_2$ = 2ND LOADING AREA
$D_1$ = 1ST DUMP AREA
$D_2$ = 2ND DUMP AREA

APPARATUS AND METHOD FOR LOCATING A VEHICLE IN A WORKING AREA AND FOR THE ON-BOARD MEASURING OF PARAMETERS INDICATIVE OF VEHICLE PERFORMANCE

This application is a continuation-in-part application of U.S. Ser. Nos. 604,739 filed 4-27-84, now Pat. No. 4,630,227 and 717,042 filed 4-1-85.

TECHNICAL FIELD

The invention generally relates to monitoring and controlling the movement of a fleet of hauling vehicles and, more particularly, to dispatching each vehicle in a fleet of hauling vehicles to various destinations in response to accumulated data indicative of hauling conditions and vehicle location.

BACKGROUND

Truck haulage is widely used in open-pit mining and similar operations. It is also the largest cost item in the operation of an open-pit mine. Truck replacements, which are necessary from time to time, involve large amounts of capital. These and other factors have led mine operators to search for ways to improve the effectiveness of the truck-loading equipment fleet in order to lower costs and maintain a profitable operation in the face of declining markets and increasing, worldwide competition.

In the past, control of truck haulage in an open-pit mine was usually accomplished in one of two ways. In the first way, the trucks are given a fixed assignment or route for an entire working shift. In the second way, a dispatcher located at a vantage point radios instructions to each driver after he has dumped a load. Obviously, the use of a dispatcher is more desirable than a fixed route since the dispatcher may react to changing conditions occurring in the mine during the course of a working shift. For operations utilizing a relatively small fleet of trucks, the number of trucks is manageable, and a dispatcher may be successful in improving the efficiency of the fleet. But as the fleet of trucks grows to a number in excess of 25 trucks, a dispatcher is not capable of effectively routing the trucks in a manner which significantly improves the efficiency of the fleet. The dispatcher simply does not have sufficient time to make the necessary decisions which are a prerequisite to each dispatch order.

Recent advances in computer technology have made it possible to use computers to help the dispatcher make the necessary decisions. In fact, computers have been used to implement semi-automated dispatch systems for a fleet of trucks. To the best of applicant's knowledge, the computerized systems currently available rely on the manual inputting of data by each truck operator: the data is downloaded via a radio link to the dispatching computer, where it is analyzed, and a dispatch order is sent from the computer to each truck as it leaves a dump site. The system must rely on each truck operator to manually enter data, such as the current status of the truck, into an on-board device for transmission to the dispatch computer via a transceiver.

In applicant's copending applications, Ser. Nos. 604,739 and 717,042, an on-board device for heavy-duty, off-road trucks is disclosed which provides a full set of load hauling data for each truck in a fleet without the necessity of any intervention by the truck operator. In applicant's application Ser. No. 717,042, a fully automated dispatch system is disclosed. The dispatch system utilizes data gathered by on-board devices placed on each of the trucks.

SUMMARY OF THE INVENTION

It is a general object of the invention to improve the performance and the flexibility of an automatic dispatch system incorporating the on-board weighing device described in U.S. application Ser. No. 604,739.

It is a more detailed object of the invention to provide a system for locating each vehicle in a fleet of vehicles within its working environment and associating values of predetermined operating parameters with a location so as to construct a data base from which vehicle movement may be monitored and commands may be generated.

It is a specific object of the invention to provide a system that uses the foregoing data base to automatically dispatch vehicles in the fleet of vehicles to specific locations.

It is another specific object of the invention to provide an automatic dispatch system which indicates to the system operator when an equipment imbalance exists.

It is also a specific object of the invention to bias operation of the automatic dispatch system in order that a dispatch order takes into account factors related to overall system goals.

It is a further specific object of the invention to provide means for automatically locating the approximate location of each vehicle within the work area of the fleet.

Briefly, in accordance with the invention, signposts having indicia associated therewith are located at key locations in the working area, and the indicia are detected by sensors on board each vehicle in the fleet. On-board sensors provide a control circuit with data indicative of vehicle performance, and the control circuit associates location data retrieved from the indicia of the signposts with performance data so as to provide a data base from which a dispatch decision can be made.

In one approach, a sensor processing unit mounted on the vehicle is responsive to signals from an on-board weighing device which are indicative of the hauling condition of the truck. Hauling signals from the on-board weighing device are processed by the sensor processing unit and the resulting data is downloaded via an RF link from each vehicle to a central station or base station wherein a data base is formed. From this data base, the central station monitors vehicle performance and reports values of predetermined parameters that fall outside an acceptable range of values. The data base may also be used for transmitting dispatch signals to selected vehicles in order to control the movement of the vehicles between destinations. In order to locate each vehicle within a work area, signposts are strategically located and each vehicle includes apparatus for detecting unique indicia from each signpost which indicates to the central station the location of the vehicle.

In an open-pit mining operation, the data base formed by the central station includes files for each important segment of a haul cycle—i.e., load time, return time, hauling time and total time. Based on the time information available from the data base, the central station finds for each possible destination the amount of time that the vehicle to be dispatched may expect to be delayed upon arrival at the destination. From this information, the central station may simply dispatch the vehicle to the destination with the shortest expected delay, or it may bias the delay times to take account of factors such as the desired ore blend at the dump site before selecting a destination. Furthermore, by knowing the delay times to each destination, the central station is able to determine an imbalance in the vehicle/load site availability. Specifically, in a mining operation, if the sum of all the delay times is greater in magnitude than a predetermined number, then the working site either has too much or too little of loading or hauling equipment and corrective action such as adding or retiring equipment is required.

BRIEF DESCRIPTION OF THE DRAWINGS

FIGS. 10 through 13 are flowchart diagrams for the software program of the central station preferably implemented in connection with the vehicle location system of FIG. 4a;

While the invention will be described in connection with a preferred embodiment and certain alternative embodiments, it will be understood that it is not intended to limit the invention to those particular embodiments. On the contrary, it is intended to cover all alternatives and equivalents as may be included within the spirit and scope of the invention as defined by the appended claims.

DESCRIPTION OF THE PREFERRED EMBODIMENT

Figure 1:
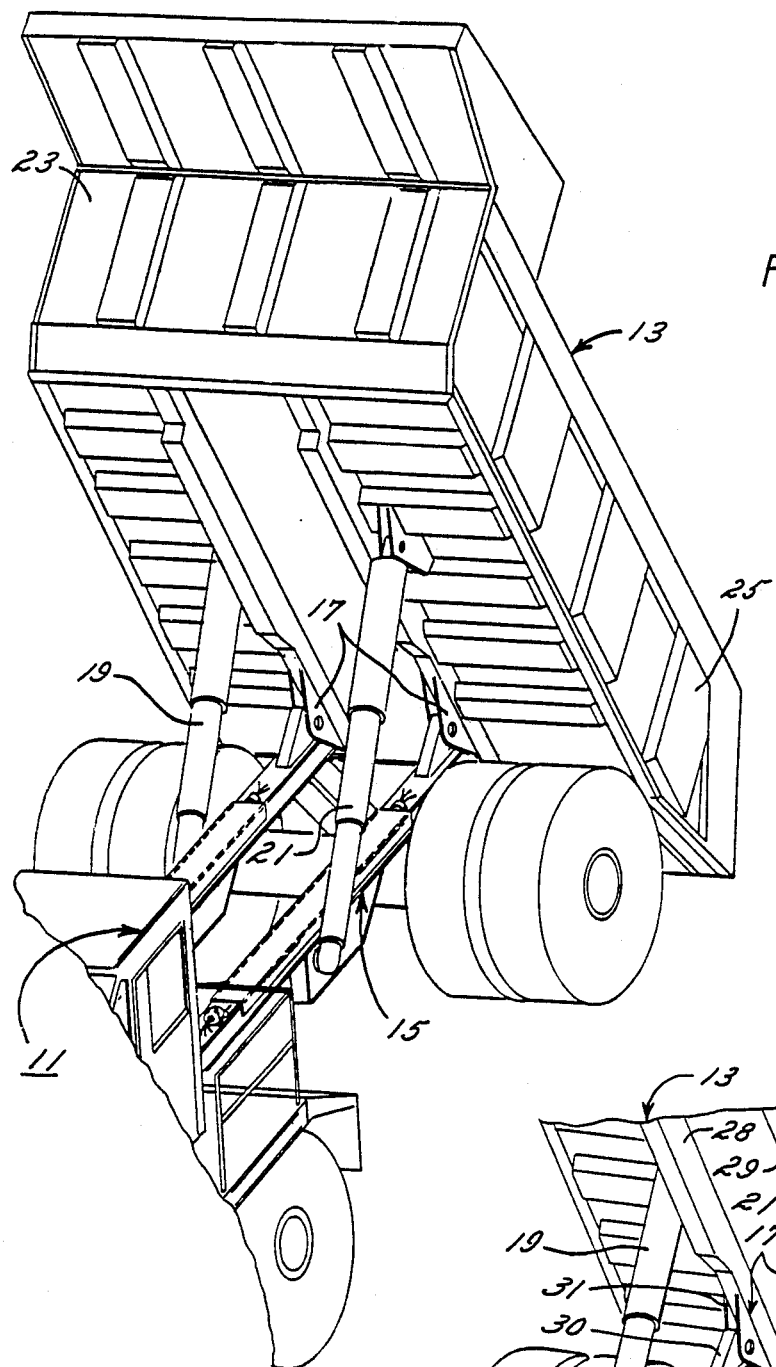
FIG. 1 is an elevated perspective view of a dump-body vehicle with the vehicle body in a raised or dump position so as to expose an on-board weighing device.
Figure 1A:
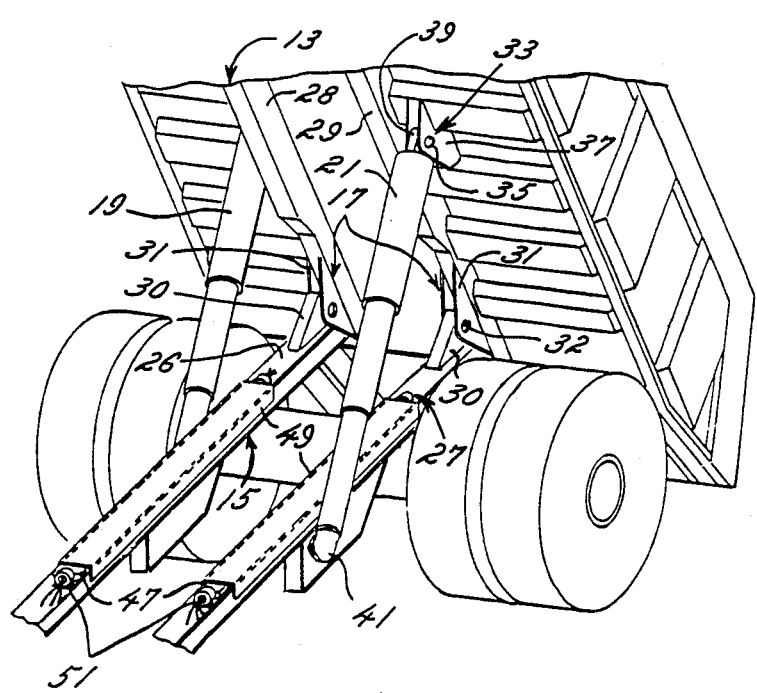
FIG. 1a is an enlarged elevated perspective view of the dump-body vehicle in FIG. 1 that more clearly shows the on-board weighing device.

Turning to the drawings, and referring first to FIGS. 1 and 1a, an off-road vehicle 11 is exemplary of the types of vehicles suitable for hauling in an open-pit mine. The vehicle 11 includes a vehicle body 13 which is hinged to the vehicle frame 15 at hinge assemblies 17. By controlling the extension of telescoping hydraulic cylinders 19 and 21, the vehicle body 13 is pivoted between a fully inclined or dump position and a lowered or rest position. One end of each hydraulic cylinder 19 and 21 is fastened to a hinge assembly located on the bottom of the vehicle body 13. The opposing end of each cylinder 19 and 21 is fastened to an articulation on the vehicle frame 15. Structurally, the vehicle body 13 consists of steel panels 23, which form the shape of the body, and beams 25 which provide the structural framework of the body. Since other dump-body trucks may also use the on-board weighing device of this invention, the truck in FIGS. 1 and 1a is intended as an exemplary vehicle frame and vehicle body utilized in connection with the invention.

Often, off-road vehicles, such as the one shown in FIGS. 1 and 1a, are very large. For instance, it is not uncommon for the tire diameter of the vehicle to be as great as the height of an average man. Accordingly, the tremendous size of these vehicles makes them expensive to operate and repair. Since these vehicles represent both a large capital investment and a large operating expense, preventing both overloading of the vehicle body and under utilization of the vehicle's load capacity (i.e., underloading) are important considerations in insuring the vehicle is operated in the most profitable manner. In particular, if the vehicle is overloaded it will tend to have a shorter usable life because of the excessive wear caused by the overloading. On the other hand, if the vehicle is underloaded, the vehicle must be operated over a longer period of time, thereby consuming more fuel and wearing the vehicle's parts to a greater degree. Therefore, the ability to accurately measure the load carried by the vehicle is important to the efficient operation of large off-road vehicles. Also, since these off-road, heavy duty vehicles are extremely expensive to operate, loading and hauling parameters indicative of vehicle performance can be of great economic value by using the parameters to discover areas of the performance which may be improved.

As most clearly shown in FIG. 1a the vehicle frame 15 is composed of two parallel beams 26 and 27 connected by transverse beams (not shown) to form a support surface for the vehicle body 13 over the rear axle of the vehicle. In order to provide a pivot axis for the vehicle body 13, each of the hinge assemblies 17 integrally connects one end of each of the parallel beams 26 and 27 to one of beams 28 and 29 on the underside of the vehicle body. In its lowered position, the beams 28 and 29 of the vehicle body 13 mate with the beams 26 and 27 of the vehicle frame 15. When the vehicle body 13 is in its lowered position, the entire weight of the vehicle body and its load is transferred to the vehicle frame 15 by way of the interface between the beams 26 and 27 of the frame and the beams 28 and 29 of the body.

Each of the hinge assemblies 17 includes first and second complementary hinge members 30 and 31 which are secured to the frame 15 and body 13, respectively, and interconnected by a pivot pin 32. The hinge assembly 17 is constructed to provide a "floating" assembly so that no weight is transferred to the frame 15 via the assembly when the body is in its lowered position. The hydraulic cylinders 19 and 21 and the vehicle body 13 are interconnected by hinge assemblies 33. (Only one of the hinge assemblies 33 can be seen in the view of FIGS. 1 and 1a). Hoist pins 35 interconnect the complementary hinge members 37 and 39 of the hinge assemblies 33. Although, as the cylinders extend, the hinge assemblies 33 accommodate the relative repositioning between the hydraulic cylinders 19 and 21 and the vehicle body 13, articulating assemblies 41 (only one is shown in FIGS. 1 and 1a), which connect the cylinders to the truck frame 15, allow a similar relative repositioning between the hydraulic cylinders and the truck frame 15.

Ordinarily, cushioning support materials such as rubber pads (not shown) are added along the length of the two parallel beams 26 and 27 of the vehicle frame 15 so when the vehicle body 13 is in its lowered position the material provides a cushioned interface between the beams 28 and 29 of the vehicle body and the beams 26 and 27 of the vehicle frame. In order to evenly distribute the weight of the vehicle body 13 along the length of the frame 15 and thereby provide the best possible weight distribution for the frame, the cushioning support material is characterized by a thickness dimension which, as explained hereinafter, cooperates with the hinge assemblies 17 when the vehicle body is moved to its lowered position. The cooperation of the cushioning support material and the hinge assemblies 17 frees the assemblies from supporting any of the vehicle body's weight when the body is in its lowered position.

In order to provide the critical hauling data required in connection with the invention, the cushioning support materials mounted by the manufacturer on the parallel beams 26 and 27 of the vehicle frame 15 are replaced by lengths of fluidfilled tubings that are laid along the lengths of the parallel beams to provide, when combined with pressure sensors, an on-board weighing device which accurately measures the weight of the vehicle body 13 while it is in its lowered position. Each of the tubings is capped by an inverted U-shaped metallic shield to protect the tubing at its interface with the vehicle body 13. The inverted U-shaped shields 49 which protect the tubings are free to move vertically on the parallel beams 26 and 27. Each of the fluid-filled tubings 47 is preferably divided into fore and aft sections which may be created either by clamping the center of one long tubing or providing two separate sections of tubing. At the ends of each of the fluid-filled tubings 47 is one of the pressure sensors 51a–d which measure the liquid pressure within the tubing. These pressure sensors 51a–d may be remotely mounted as indicated in FIG. 2.

The foregoing on-board weighing device is preferably a commercially available load sensor assembly used in connection with a vehicle weighing system identified as the OBDAS Truck Weighing System, manufactured and sold by Philippi-Hagenbuch, Inc., 7424 W. Plank Rd., Peoria, Ill. 61604.

Figure 2:
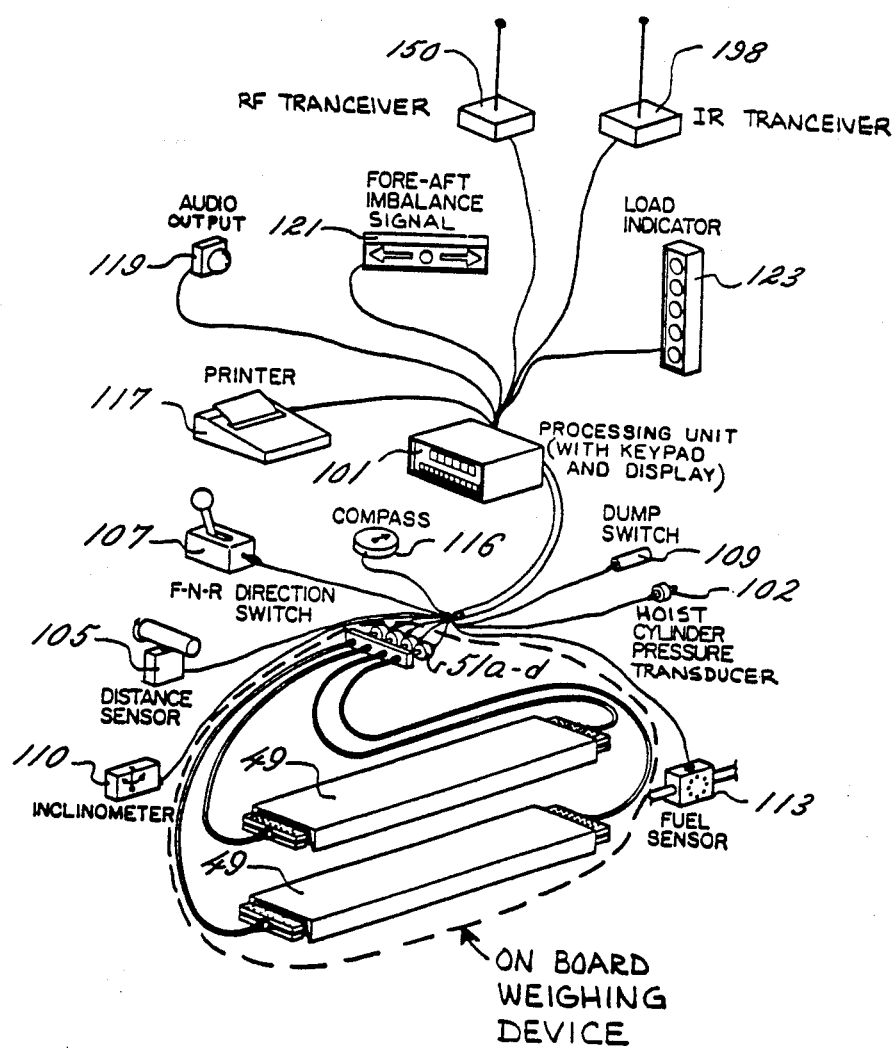
FIG. 2 is a system-level diagram of an on-board apparatus for detecting, storing and analyzing hauling parameters and location data according to the invention which includes the on-board weighing device as well as other sensor inputs.

In addition to the tubing 47, the shields 49 and the sensors 51a–d, the on-board weighing apparatus includes a sensor processing unit 101, generally as illustrated in FIG. 2, that is responsive to signals from the sensors 51a–d. By providing the sensor processing unit 101, the raw pressure data from the on-board weighing device can be converted to useful hauling information for the real-time control of the vehicle by a base station or central station. As a complement to the pressure data, the on-board weighing apparatus illustrated in FIG. 2 includes other input data sources which provide raw data to the sensor processing unit 101. As will be explained more fully hereinafter, in keeping with the invention the hauling information provided by the sensor processing unit 101 is downloaded to a central station for use in monitoring, locating and dispatching vehicles to particular locations in order to maintain operation of the vehicle fleet at peak efficiency.

Referring to FIG. 2, the complementary input data sources in the on-board weighing apparatus include, but are not limited to, a hoist cylinder pressure transducer 102, a distance sensor 105, a forward-neutral-reverse (F-N-R) direction switch 107, a dump switch 109, an inclinometer 110, a fuel sensor 113 and a compass 116. A keypad integral with the housing of the sensor processing unit 101 is used by the operator to request data and to enter information such as an operator number which identifies the operator or vehicle status to the system.

Various on-board outputs controlled by the processing unit 101 provide the vehicle operator with indications of vehicle operating conditions in response to the raw data from the on-board weighing device and complementary sensors. Specifically, a printer 117 provides a hard copy output for analysis by the vehicle operator or management personnel. An audio output 119 alerts the operator to situations requiring immediate attention. A fore/aft imbalance signal 121 gives a visual warning signal to the operator of the piece of loading equipment if the vehicle is loaded to carry too much weight in either the fore or aft area of the vehicle body. In order to provide the operator with non-permanent data information, such as current weight, a digital display is mounted to the housing of the sensor processing unit 101. Load indicator lights 123 are preferably mounted on the side of the vehicle in order to give the operator of the loading equipment an idea of the remaining capacity in the vehicle body as determined by a comparison of present weight with a stored maximum weight.

Finally, an RF transceiver 150 is provided in order to download accumulated data to a central station. As explained hereinafter, the downloaded data is used by the central station for construction of files comprising a historical data base which preferably serves as a basis for controlling the movement of the vehicles between particular destinations. The manner of cooperation and interaction of the foregoing inputs and outputs in FIG. 2 that enable control of vehicle movement will be set forth in greater detail hereinafter.

Figure 3:
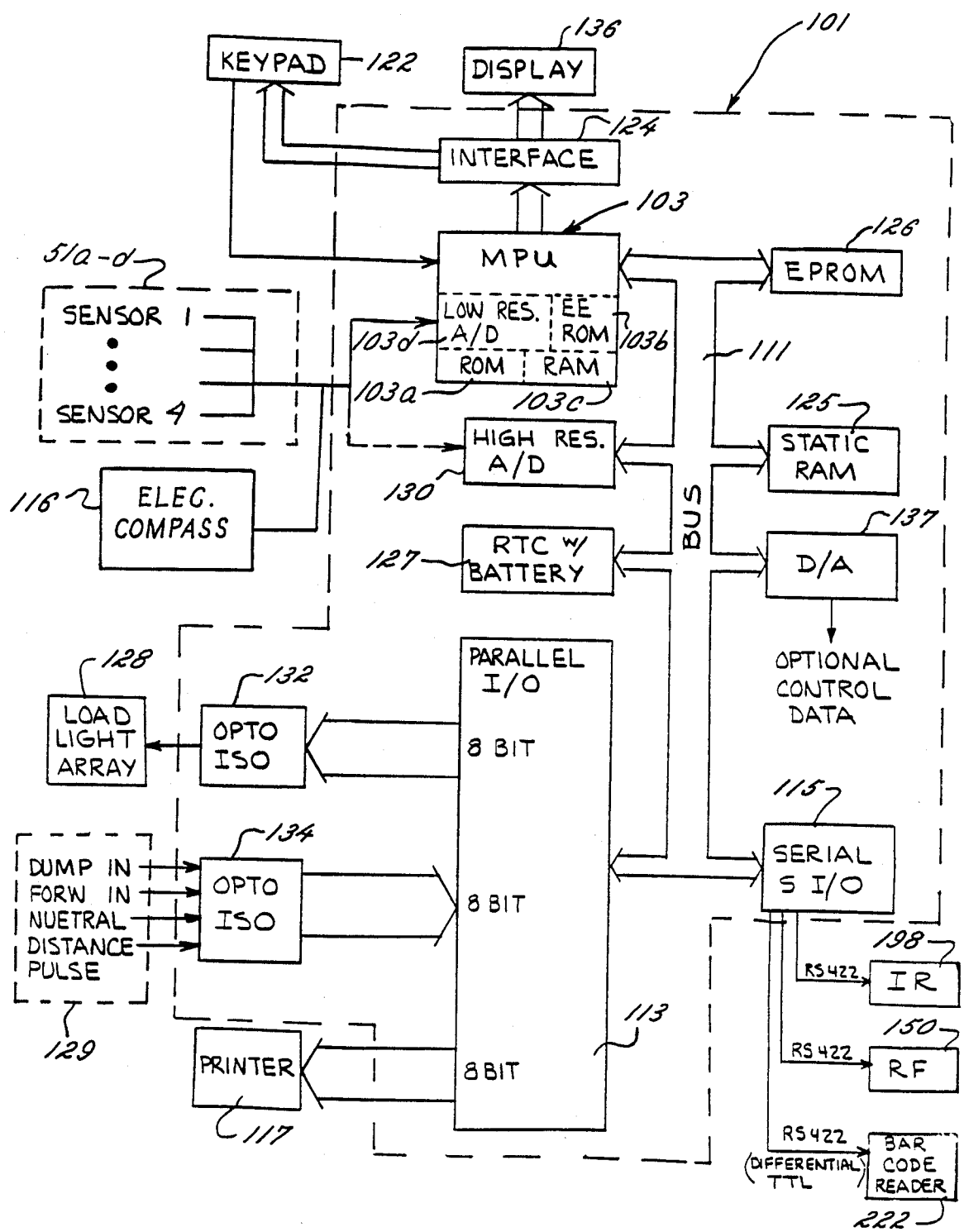
FIG. 3 is a schematic diagram of a sensor processing unit included in the on-board apparatus of FIG. 2.

Referring now to FIG. 3, the electrical circuitry which provides on-board manipulation of the data received from the on-board sensors such as the on-board weighing device is provided by the sensor processing unit 101. Preferably, the sensor processing unit 101 is microprocessor based. As will be apparent to those skilled in the art, the sensor processing unit 101 includes a micro processing unit 103 (hereinafter MPU 103), associated internal memory in the form of a ROM 103a, EEROM 103b, a read/write memory RAM 103c, and an analog-to-digital converter 103d. A particular example of a MPU suitable for the sensor processing unit 101 is the G811 microprocessor manufactured by Motorola Corporation of Schaumburg, Ill.

In conventional fashion, emanating from the MPU 103 is a microcomputer bus 111. The microcomputer bus 111 includes data lines, memory lines and control lines. The bus 111 is connected to input/output ports 113 and 115, that are parallel and serial ports, respectively. The microcomputer bus 111 communicates to a load light array 128 and several of the on-board sensors (generally indicated in block 129) by way of parallel input/output port 113 via optical isolators 132 and 134. The printer 117 communicates directly to the input/output port 113 The load light array 128 in FIG. 3 is intended to represent as one block all the various load lights that may be placed on board a vehicle, such as load indicator 123 and fore-aft imbalance signal 121 in FIG. 2. Similarly, block 129 is intended to represent all of the digital sensors that may provide data to the sensor processing unit 101.

In order to provide the sensor processing unit 101 with a means for accepting manual inputs, the microcomputer bus 111 is connected to a keypad 122 by way of an interface 124. For example, the keypad 122 provides the sensor processing unit 101 with a conversion factor for converting the stored pressure readings to weight values in tons, pounds or kilograms. The display 136 preferably mounted to the housing of the sensor processing unit 101 receives signals from the MPU 103 via the interface 124.

A static RAM memory 125 is connected to the MPU 103 via the bus 111 in order to provide for storage of data collected between successive occurrences of data downloading. Also in communication with the MPU 103 via the bus 111 is an EPROM 126 that contains the program instructions executed by the MPU and a real time clock and battery 127.

The sensors 51a-d of the on-board weighing device provide the circuitry of FIG. 3 with analog electrical signals which are linearly proportional to the pressure exerted by the tubing fluid. Since the pressure of the tubing fluid is linearly proportional to the weight of the truck body 13 and since the sensors 51a-d reflect the tubing fluid pressure in a linear fashion, the analog signals from the sensors are proportional to the weight of the truck body. The analog signals from the sensors 51a-d are typically received by a low resolution analog-to-digital (A/D) converter 103d; but, a high resolution A/D converter 130 may be substituted if additional accuracy is desired. Since the electric compass 116 is typically an analog device, it is also received by the A/D converter 103d. A digital-to-analog (D/A) converter 137 is provided as an output device on the bus 111 for implementing control of analog devices that may be added to the vehicle (e.g., a throttle control mechanism).

In order for the sensor processing unit 101 to communicate with the central station 155, the RF transceiver 150 is coupled to the sensor processing unit 101 via an RS 422 to the serial input/output port 115. In a manner similar to that of the RF transceiver 150, the infrared (IR) transceiver 198 is coupled to the sensor processing unit 101 via an RS 422 connection. The IR transceiver 198 may be used to send data from the sensor processing unit 101 to another IR transceiver site via the input/output port 115. The IR and RF transceivers 198 and 150, respectively, are separately keyed by the sensor processing unit 101 via the port 115, and they are mounted to the vehicle 11 in appropriate and convenient locations in order to enable the sensor processing unit 101 to establish high quality RF and IR links.

Figure 4A:
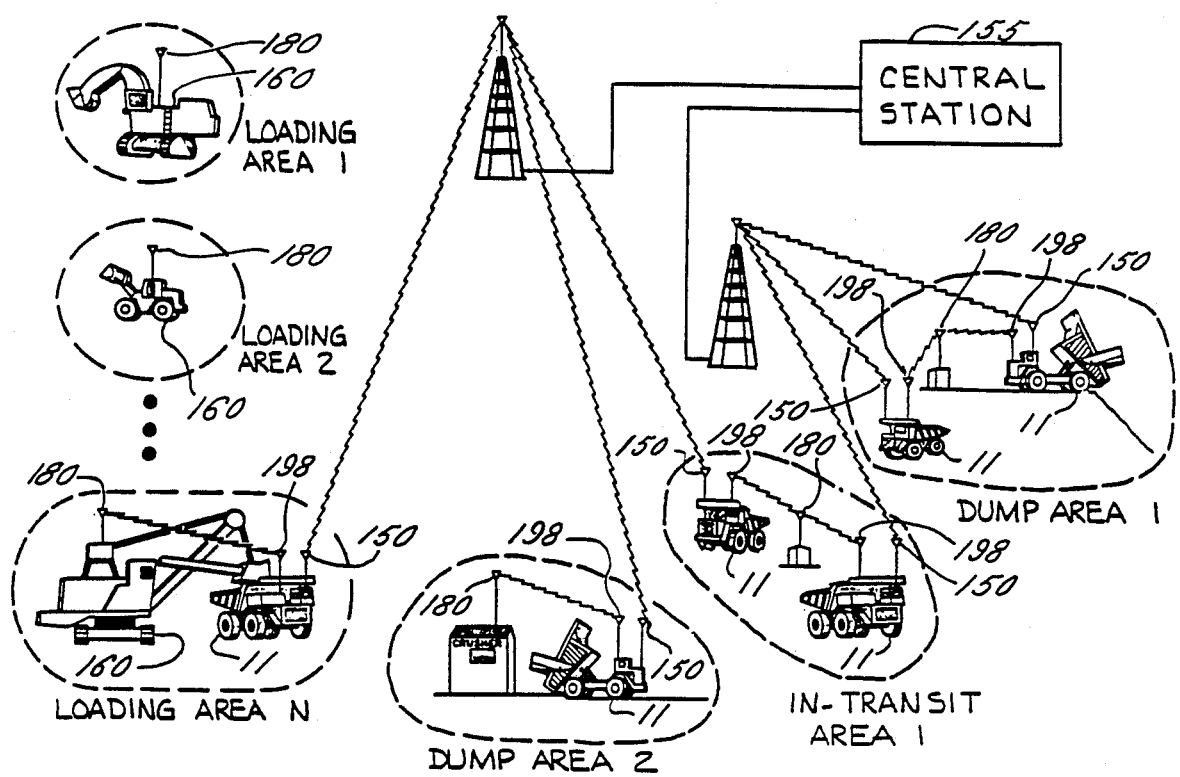
FIG. 4a is a system-level diagram illustrating a vehicle location system according to a first embodiment of the invention, wherein stationary signposts cooperate with the on-board apparatus of FIG. 2 to supply location and hauling data to a central station for monitoring vehicle performance and for controlling movement of the vehicle fleet within a work area.
Figure 4B:
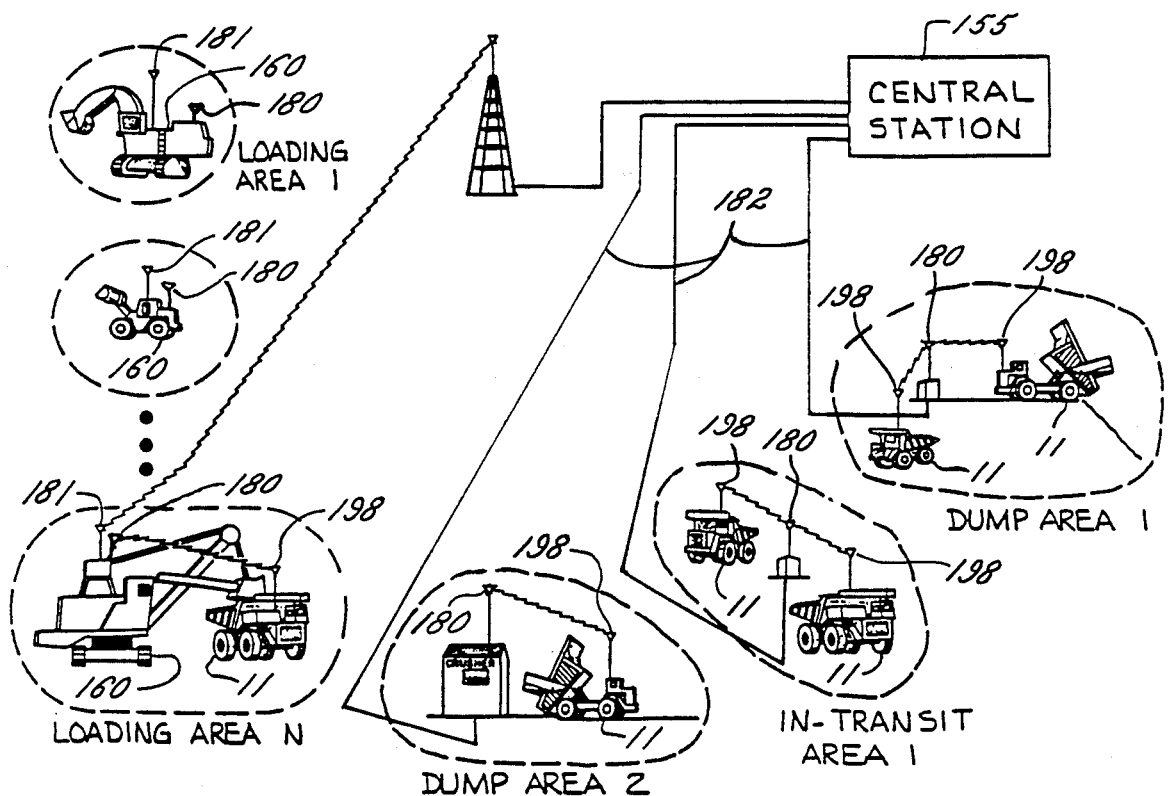
FIG. 4b is a system-level diagram illustrating a vehicle location system according to an alternative embodiment of the invention.

Referring to FIGS. 4a and 4b, in mining operations or similar type hauling, it is not unusual for there to be simultaneous hauling of different ore such as overburden, coal or the like. Also, in large operations, more than one loader 160 services the truck fleet and there may be more than one dump site. In these large operations many hauling vehicles and loaders are involved and controlling traffic flow from the dump sites to the loaders 160 or vice-versa becomes unwielding, and therefore inefficient.

In the system of FIG. 4a, the central station 155 communicates with each of the sensor processing units 101 on board the off-road, heavy duty vehicles by way of an electromagnetic link (preferably an RF link). Data transmitted to the central station 155 from each of the sensor processing units 101 by way of the on-board RF transceiver 150 (FIG. 2) is processed by the central station and instruction data is returned to each sensor processing unit 101 via the RF link.

In accordance with one important aspect of the invention, a plurality of signposts are provided at intended locations of the vehicles wherein each signpost is characterized by indicia that are distinctive to the associated destination. On board each vehicle is an apparatus for detecting the indicia of each signpost and generating data indicative of vehicle location. The location data is correlated with data from some or all of the sensors 102, 105-115, 116 in FIG. 2 by either the sensor processing unit 101 on board each vehicle or by the central station 155. A data base developed by the central station 155 from data downloaded from all the sensor processing units 101 provides the central station with an information base for monitoring and controlling the movement of the vehicles 11. Specifically, the downloaded data may be used by the central station 155 to route a vehicle which has just dumped its load to a piece of loading equipment that is the least busy.

In accordance with a first embodiment of the invention, an infrared (IR) transceiver 198 in FIG. 2 is mounted to each vehicle for detecting coded IR radiation within a predetermined range of the source of the radiation such that detection of the coded IR radiation provides an indication of the location of the vehicle within the working area. Radiation from each IR source is uniquely coded so that the sensor processing unit 101 associated with the detecting transceiver may identify the region of the working area the vehicle is within. Because the IR radiation is greatly attenuated as it propagates through the air, the effective range of each source is quite limited. Although this feature of significant attenuation is commonly viewed as undesirable, in the system of the invention it is a desirable feature because multiple IR sources can be strategically placed in the working area of an open-pit mine site yet remain separated by distances such that their effective ranges do not overlap.

In FIGS. 4a and 4b, infrared or IR radiators 180 are signposts according to the invention that are strategically placed such that their effective ranges (indicated by the dashed closed loops) do not overlap. Distribution of the IR radiators may be limited to only load and dump sites or it may be more extensive and include intermediate or in-transit locations as suggested by IN-TRANSIT AREA 1 in FIGS. 4a and 4b. Finally, the IR link between a loader and a vehicle may be bi-directional in order to give the operator of the loader an indication of the vehicle's load condition. Such a communication link would be similar to the link set forth above in connection with the central station 155.

For example, as the vehicle 11 in FIG. 4a leaves the DUMP AREA 1, it is notified by the central station 155 which loading area (n) has the minimum delay. The vehicle 11 is then on its way to that particular loading area. The vehicle 11 may possibly accumulate some data in route to that particular loader 160. If the vehicle is polled again in transit, hauling and location data accumulated enroute to the designated loading area (n) is transmitted to the central station 155.

Once the vehicle 11 gets to its designated loader 160 or loading area, the gearshift is placed in neutral or reverse by the driver. This change in gear is detected by the F-N-R direction switch 107 of the on-board weighing apparatus and the data is downloaded via the RF transceiver 150 to the central station 155. Because the downloaded data includes a location code from the IR transceiver 198, the central station 155 thereby has further confirmation that the vehicle 11 has arrived at the designated loader. An example of an IR receiver suitable for implementing the invention on each vehicle is an Automata "IRRX" infrared receiver manufactured by Automata Corporation, Gross Valley, California. An IR transmitter suitable for use as a signpost is a pared down field station with an infrared transmitter that is also manufactured by Automata. The function of the IR signpost is to send a location I.D. number to the IR receiver on board each vehicle 11. Each transmitter 180 is adjusted to have a wide angle transmit beam.

FIG. 4b illustrates alternative means for downloading data to the central station 155. If each signpost utilizes an IR transceiver (instead of only a transmitter as in FIG. 4a), data may be download from a vehicle within th effective area of the signpost via an IR link between the signpost and the IR transceiver 198 mounted on the vehicle. From each signpost, the downloaded data can be transferred back to the central station 155 via either an RF link provided by RF transceivers 181 similar to those on board the vehicles in the system of FIG. 4a or via a hard-wire link 182 provided by cable connections from each signpost to the central station. Data is transferred to the vehicles by the reverse routing—i.e., RF or hard-wire link to infrared link. In certain situations, the alternative approach suggested in FIG. 4b may be more economical than that of FIG. 4a since a RF transceiver need not be provided for every vehicle 11.

The central station 155 or base station may use its data base developed from information downloaded to it from the various on-board weighing devices to develop a dispatch signal for each vehicle as it leaves a signpost location site. Specifically referring to the open-pit mining operation of FIGS. 4a and 4b, the central station 155 includes means for determining the loading area (n) that is the least busy and means for dispatching the vehicle to that area. The data base developed by the central station 155 includes records of elapsed times for different segments of a haul cycle. Preferably, these segments include (1) loading time, (2) loaded haul time, (3) actual return time and (4) queuing time at the loading site. In order to organize the collected data, the data base preferably is comprised of a file for each hauling segment. In order to fill each file with data, the sensor processing unit 101 accumulates the appropriate data and downloads it to the central station 155 via the RF link as will be explained more fully hereinafter.

For the loaded haul time, the sensor processing unit 101 begins to accumulate time after the F-N-R direction switch 107 is first shifted to its forward position for a measurable period of time after the on-board weighing device indicates loading has begun. The sensor processing unit 101 stops accumulation of loaded haul time when a signal is detected from the dump switch 109 indicating the load has been dumped.

For loading time, the sensor processing unit 101 means reads data from the on-board weighing device and the F-N-R switch 107. When the sensor processing unit 101 senses an increase in the load carried by the truck, the sensor processing unit 101 begins to accumulate time as "loading time". Accumulation is stopped when the sensor processing unit 101 senses a shifting of the F-N-R direction switch 107 to a forward position after a measurable period of time.

For the return time, the sensor processing unit 101 begins to accumulate time after the dump switch 109 is activated, and it stops accumulating time when the on-board weighing device indicates loading has begun. In order to determine the actual return time, the processing unit 101 subtracts the "queuing time" from the return time, thereby providing a more accurate indication of the time required to return to the loading site Queuing time is the time in which a vehicle waits at a loading area before it begins loading.

For the queuing time, the sensor processing unit 101 reads data from the distance sensor 105 (an odometer) and the F-N-R switch 107. The processing unit 101 begins to accumulate queuing time if it senses no movement of the truck while the F-N-R direction switch 107 is in a forward position for more than a predetermined period of time—e.g., five seconds. Alternatively, when the F-N-R direction switch 107 is placed in neutral, the sensor processing unit 101 will also accumulate queuing time.

In accordance with another important aspect of the invention, data gathered by each of the sensor processing units 101 are downloaded to the central station 155 wherein the accumulated data is organized into a data base having a plurality of files which not only allow the central station to dispatch vehicles to a piece of loading equipment with the shortest actual loading delay time, but also allow the computer to maintain fleet balance by sensing over or under utilization of equipment. Specifically, as part of the dispatch function, the central station 155 totals the waiting times associated with the pieces of loading equipment and determines if the overall operation is unbalanced —e.g., too many vehicles or too few pieces of loading equipment (vis-a-vis too few hauling vehicles or too many pieces of loading equipment).

During data downloading of the vehicles 11 by the central station 155, data may be transmitted indicating an "out-of-service" condition or an "in-transit" condition for the vehicle. By providing data such as the foregoing, the central station 155 may keep track of which vehicles are currently loading, dumping, in transit or out of service. As vehicles 11 are directed to various loaders 160, dump sites, etc., the central station 155 notes a projected time of arrival for the vehicle based on its historical data base as explained more fully hereafter. If a vehicle 11 fails to arrive at its designated location within this time period plus a predetermined percentage of the period, then the central station 155 may provide a sensory alert to management personnel so that the status of the vehicle can be checked. For those vehicles 11 which go out of service, the central station 155 can update the load delay for the particular loader 160 for which the out-of-service vehicle was destined.

Figure 8A:
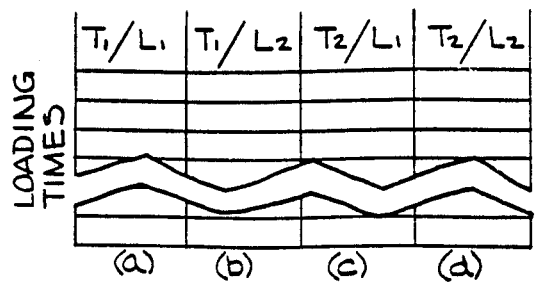
FIGS. 8a–d are schematic diagrams of the data files formed in an electronic memory associated with the central station of FIGS. 4a and 4b which receives data from the on-board apparatus of various vehicles.
Figure 8B:
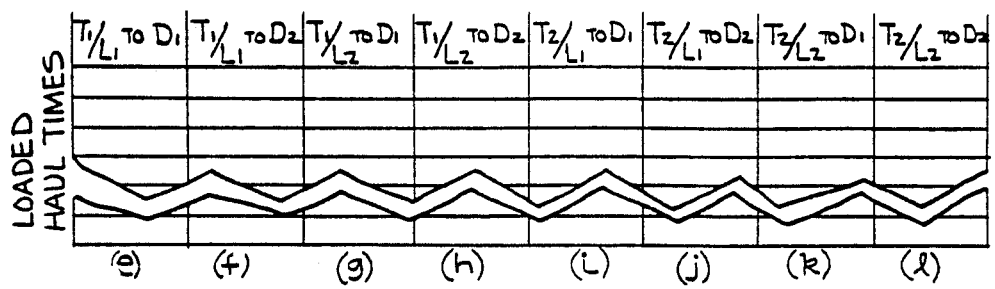

Information from each of the sensor processor units 101 is downloaded to form a master data base schematically illustrated in FIGS. 8a-d that is associated with the central station 155. The files of the data base are easily manipulated in keeping with the invention to provide useful real time information to management personnel. Conceptually, the master data base shown in FIGS. 8a-d of the central station 155 contains four primary files from downloaded data:

(1) Loading time for each type of vehicle with each type of loading equipment (FIG. 8a);
(2) Loaded haul time from each type of loader to each dump area for each type of vehicle (FIG. 8b);
(3) True return time from each dump area to each type of loader for each type of vehicle (FIG. 8c); and
(4) Total haul cycle time for each type of vehicle from each type of loader to each dump area (FIG. 8d).

This master data base is constructed from an underlying data base for each vehicle (not shown).

As a particular example of the application of the four primary files in the master data base, if a mine has ten 170-ton Wabco trucks and ten 120-ton Euclid trucks, then the central station 155 will have an underlying data base including historical subfiles for each truck. Data from the Wabco subfiles are reorganized into the four primary files; a likewise reorganization is done for the Euclid data. Then, as each respective truck generates data, its corresponding historical subfile and the appropriate cells in the primary data files are updated. Data from the primary files may be used to dispatch the trucks to particular location and thereby control fleet movement to achieve a desired goal.

In accordance with yet another important aspect of the invention, the central station 155 includes means for giving preference to certain loading sites in a dispatch decision, depending on selected parameters chosen by the operator. For example, the primary files of the data base used by the central station 155 to make dispatch decisions may be supplemented to include data for the blend of ore existing at each load site. From this additional data, certain load sites may be given preference in dispatch decisions in order to control the blend of ore at a dump site. Other factors may be integrated into the dispatch decisions in order to precisely control the mining of ore and the utilization of the vehicle fleet in a desired manner.

Because the on-board weighing device and the associated circuitry in FIGS. 2 and 3 determine when a vehicle starts (the first bucket is sensed) and ends loading (first forward gear shift after a measurable time has elapsed after first bucket) and when dumping of a load occurs, the program of the computer at the central station 155 is able to use this data (as well as other operating data) to provide efficient instructions and directions for controlling movement of the vehicles without depending on any human cooperation, e.g., no one need remember to manually hit a load or dump switch to signal the central station. Because the system is fully automated, it is highly reliable. In addition, the data gathered by real-time RF data downloading from each vehicle, when stored and analyzed by the central station, allows for precise control of the routing of the vehicles.

Figure 5A:
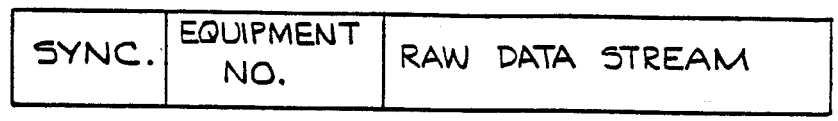
FIGS. 5a and 5b are schematic diagrams of the format used to transmit data from each vehicle to the central station in FIGS. 4a and 4b and from the central station to a desired vehicle, respectively.
Figure 5B:
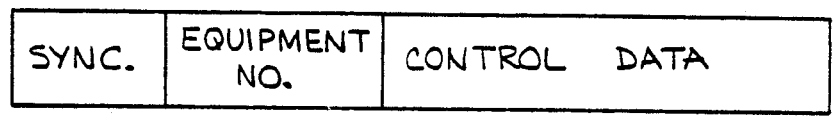

Referring to FIGS. 5a-b, by way of RF transceiver 150 each of the vehicles 11 downloads a data frame comprising a synchronization word followed by the equipment (e.g., vehicle) number and the raw data, including equipment location from the signposts. The type of data is identified to the central station 155 by its position in the data stream. In response to the position of the data in the data stream, the central station 155 stores and analyzes the data in the appropriate manner. After the central station 155 properly analyzes this data it may, depending on vehicle status, send a data frame comprising a synchronization word sequentially followed by the particular equipment number and control data.

In operation, the central station 155 receives the raw data in the data stream from a vehicle 11 in response to a polling request provided by the RF link and updates its data base with new data. If the present status indicates the vehicle requires a dispatch instruction for its next destination, the central station makes a decision based on its data base and transmits by way of transceiver 155a (FIG. 6) a data frame as illustrated in FIG. 5b, containing a particular equipment number the central station wishes to address and a particular destination I.D. which the central station wishes to direct the vehicle. Each vehicle 11 receives the data frame from the central station 155, but only the equipment having the same number as the number transmitted will respond to the data containing the destination number.

When the equipment number of a receiving vehicle and the transmitted equipment number data correspond, the designation number transmitted with the equipment number is either displayed on the processor's display of the designated vehicle or printed as hard copy on the vehicle's printer 117. From the destination number, the vehicle operator knows which area to go to for his next task. For example, the central station 155 delivers loading area destination data to a hauling vehicle in an open-pit mining operation after the vehicle has dumped its load. Many other useful destination commands will be appreciated by those familiar with mining operations.

Figure 6:
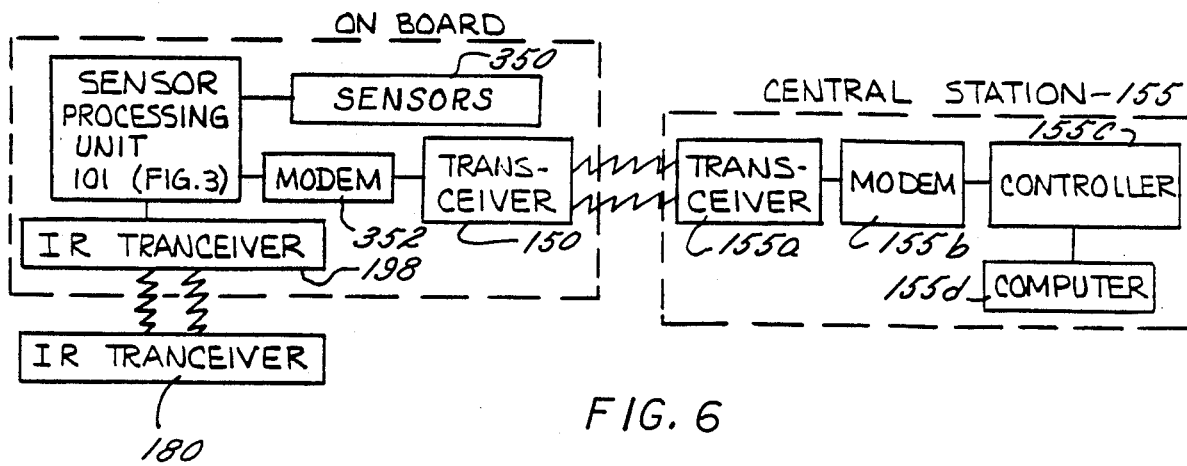
FIG. 6 is a schematic diagram illustrating the data transfer links between (1) the stationary signposts and the sensor processing unit of FIG. 3 on board each vehicle and (2) the sensor processing unit and the remote central station.

In order to provide a two-way RF link, the central station 155 includes a commercially available transceiver 155a, a modem 155b and a controller 155c as shown in FIG. 6. Data received from the vehicles 11 is processed by a computer 155d by way of the execution of software written in accordance with the flowcharts of FIGS. 10-13. The computer 155d may be a commercially available computer such as the IBM PC AT. The specific type of RF link could be any type of commercially available data link suitable for transfer of the type of data here involved such as the Telxon RF/FM data communication system using a two-way a synchronous protocol. Such a system is used in an RFX-10 system (full duplex), manufactured by Telxon, Inc., 3330 W. Market St., Akron, Ohio 44313.

To complete the Telxon link in FIG. 6, a modem 352 connects the sensor processing unit 101 to the RF transceiver 150. The data inputs to the sensor processing unit 101 are provided by the on-board IR transceiver 198 and the various on-board sensors such as the on-board weighing device. The sensors are collectively symbolized by block 350 in FIG. 6 and a single signpost (IR transceiver 180) is also shown to illustrate the IR data link between a vehicle and a signpost.

Figure 7:
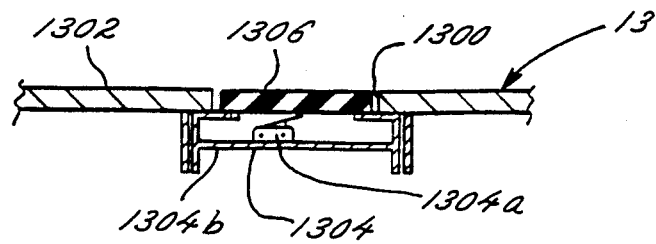
FIG. 7 is an enlarged, partial cross-sectional view of the bed of the body of a vehicle in FIGS. 4a or 4b showing an apparatus mounted below the bed as an alternative to the on-board weighing device illustrated in FIGS. 1 and 1a for sensing the presence of a load in connection with the monitoring and controlling of the vehicles of FIGS. 4a and 4b.

Referring briefly to FIG. 7, an opening 1300 may be provided in the bed 1302 of the body 13 of the vehicle shown in FIGS. 1 and 1A for allowing a switch assembly 1304 to sense the presence of a load and thereby indicate to the sensor processing unit 101 when loading begins. Such a device substitutes for the on-board weighing device of FIGS. 1, 1A and 2 and combines with the sensor processing unit 101 to give a simplified vehicle dispatch system according to FIGS. 4a and 4b. With the addition of the switch assembly 1304 in FIG. 7, the on-board weighing device is not required for a simply dispatch system responsive to load and dump signals only.

The opening 1300 in the floor of the truck body 13 is covered by a flexible, but rugged material 1306 such as a thick rubber mat which is secured to the perimeter of the bed 1302 of the vehicle body that forms the opening 1300. A microswitch 1304a comprises the switch assembly and is mounted to a platform 1304b positioned below the bed 1302 so that the switch is recessed into the body and the mat 1306 provides a planar continuation over the platform and switch. In response to the introduction of material into the body 13, the mat 1306 is depressed, thereby closing the microswitch 1304a. The closure of the switch 1304a generates a signal indicative to the sensor processing unit 101 of the starting of loading.

Figure 8C:
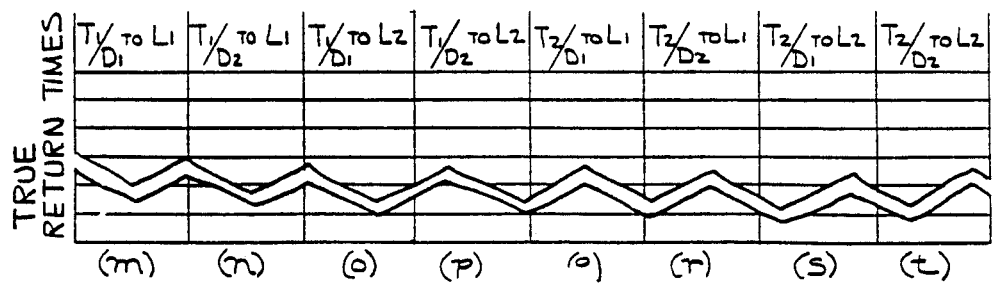
Figure 8D:
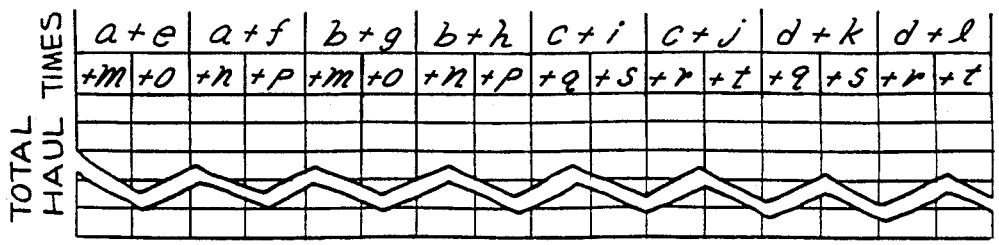

The data base developed by the computer 155d at the central station preferably consists of four primary data files illustrated in FIGS. 8a–8d. Each of the first three data files (FIGS. 8a, 8b and 8c) records segments of a hauling cycle such that the sum of all three segments is a complete cycle. The sum of the three segments is provided in the fourth file shown in FIG. 8d. In the illustrated files, provision is made for two types of vehicles, $T_1$ and $T_2$, two loading sites, $L_1$ and $L_2$, and two dump sites, $D_1$ and $D_2$ For example, the first column in the data file of FIG. 8a is $T_1/L_1$, which indicates loading times for $T_1$ type vehicles at loading area $L_1$. In FIG. 8b, each column is the time recorded for a vehicle of a particular type ($T_1$ or $T_2$) to travel from a loading area ($L_1$ or $L_2$) to a dump area ($D_1$ or $D_2$). The data file of FIG. 8c is for the opposite route —i.e., from dump area to loading area.

Figure 16:
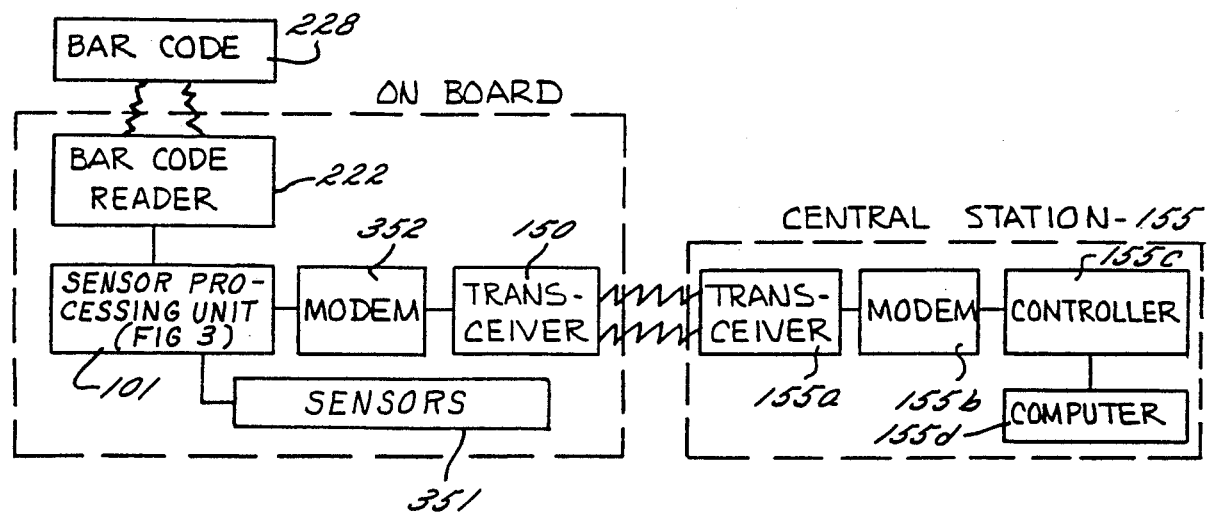
FIG. 16 is a system-level diagram of the data transfer of location and load data from on board the vehicle of FIG. 14 to a remote central station via an RF link in accordance with the invention.

Turning to the flowcharts of FIGS. 9–13, the programs for the sensor processing unit 101 and the computer 155d of the central station 155 are disclosed in connection with an open-pit mining operation as the intended environment. It will be appreciated by those skilled in the art that obvious modifications to the program may be made in order to accommodate other environments such as that of a garbage truck fleet. In this connection, a garbage truck is illustrated in FIG. 14, and FIG. 16 indicates an sensor processing unit of the type disclosed in FIG. 3 incorporated into the vehicle for communication with a central station in a similar manner and with a purpose as that disclosed in connection with the open-pit mining environment.

Figure 9:
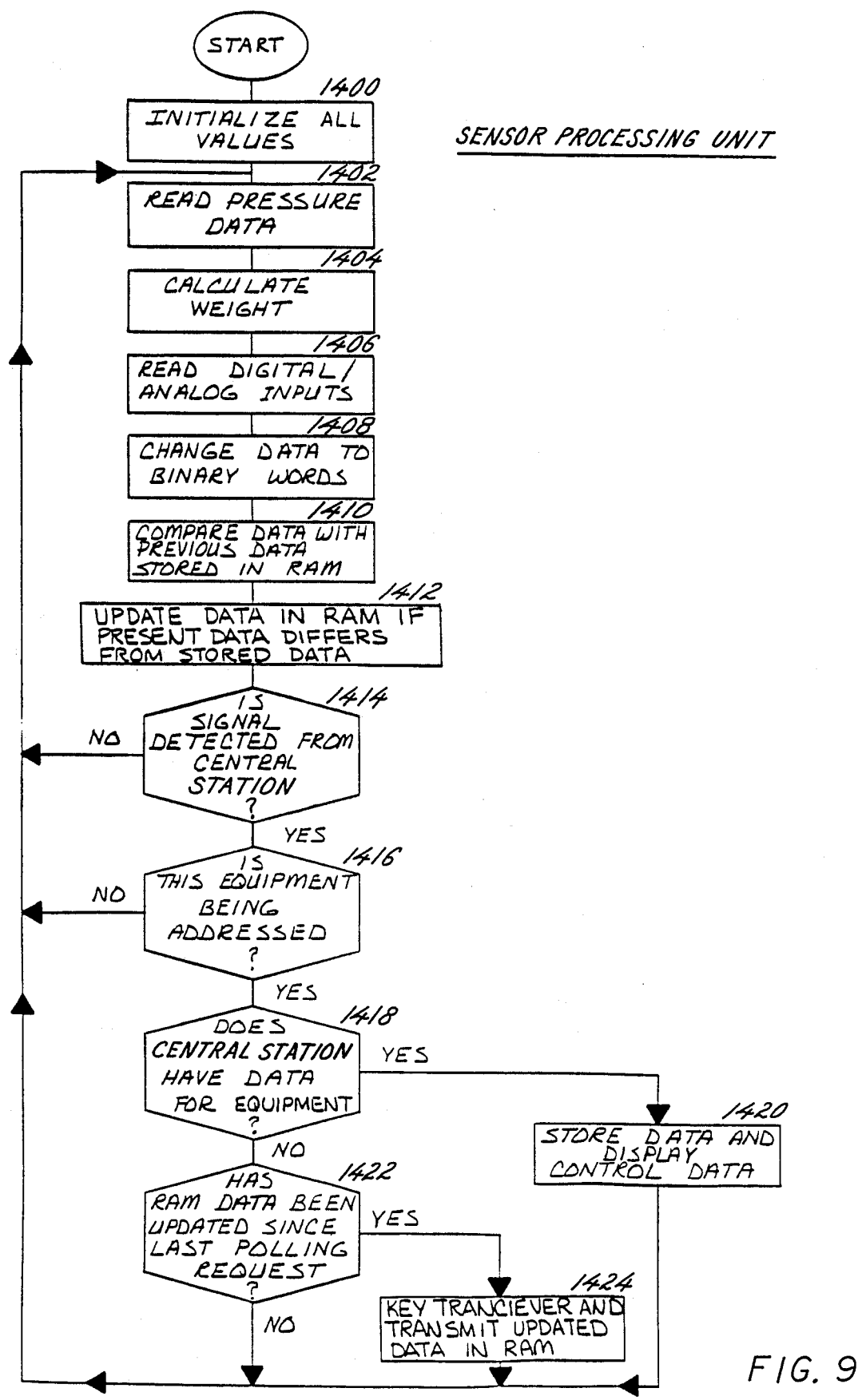
FIG. 9 is a flowchart diagram for the software program preferably implemented in connection with the sensor processing unit of the on-board apparatus as shown in FIG. 3.

Referring first to the flowchart for the program of the sensor processing unit 101 shown in FIG. 9, data is collected from the various sensors mounted on board the truck and accumulated in memory (static RAM 125 in FIG. 3) until the data is downloaded to the central station 155. To start execution of program tasks, all values are first initialized at step 1400 before beginning execution of steps 1402–1414 which gather data from the various sensor inputs to the sensor processing unit 101.

In step 1402, the signals from the pressure sensors 51a–d are read via either the low or high resolution A/D converters 103d or 130. The pressure data is converted to weight data in step 1404 by way of a linear relationship determined during the calibration of the system. In step 1406, all other analog and digital data is read from the various on-board sensors exemplified by those shown in FIG. 2. In order for the sensor processing unit 101 to manipulate information from the analog sensors, the analog data must, of course, be converted to binary data as indicated in step 1408. In step 1410, the data read in steps 1402 and 1406 are compared with the data stored in the static RAM 125. If the newly acquired data is different or if the new data is time dependent, the data is placed into the RAM in step 1412 in order to update the data base.

Steps 1402 to 1412 are repeated until the sensor processing unit 101 detects a signal from the central station 155 at step 1414. When a signal from the central station 155 is detected, the sensor processing unit 101 first determines if an address word in the signal matches the I.D. code for the processor in step 1416. A match of the address code and the processor's I.D. causes the processor to react to incoming data in steps 1418 and 1420. If the central station is polling the sensor processing unit 101, steps 1422 and 1424 are executed. Steps 1414 through 1424 are preferably executed using the same or similar two-way asynchronous protocol and format used by the commercially available Telxon RFX-10 System, manufactured by Telxon Corporation, Akron, Ohio.

If the sensor processing unit 101 is not being addressed in step 1416, the program returns to step 1402 and the processing unit continues to update its data base stored in RAM 125. Also, once received data has been stored and displayed in step 1420 or vehicle data has been downloaded in step 1424, the sensor processing unit returns to updating the data base. In step 1422, if the static RAM 125 has not been updated since the last polling, no data is downloaded. The central station will poll the next vehicle and its sensor processing unit after a predetermined time has elapsed without a response to its last polling request.

The computer 155d at the central station receives the data downloaded from each of the sensor processing units 101 by way of the transceiver 155a, modem 155b and controller 155c. The downloaded data is manipulated according to the flowchart program of FIGS. 10–13. By manipulating the received data in accordance with one important aspect of the invention, the central station 155 reports vehicle operating parameters that fall outside a predetermined range, and it also provides a dispatch command for directing vehicle movement in the working area. Correlation of location and vehicle operation data provides the central station 155 with a data base that allows for meaningful and precise monitoring of vehicle operation, identifying irregularities in vehicle operation and also allows for dispatching commands that maximize the efficiency of the fleet of vehicles.

Figure 10:
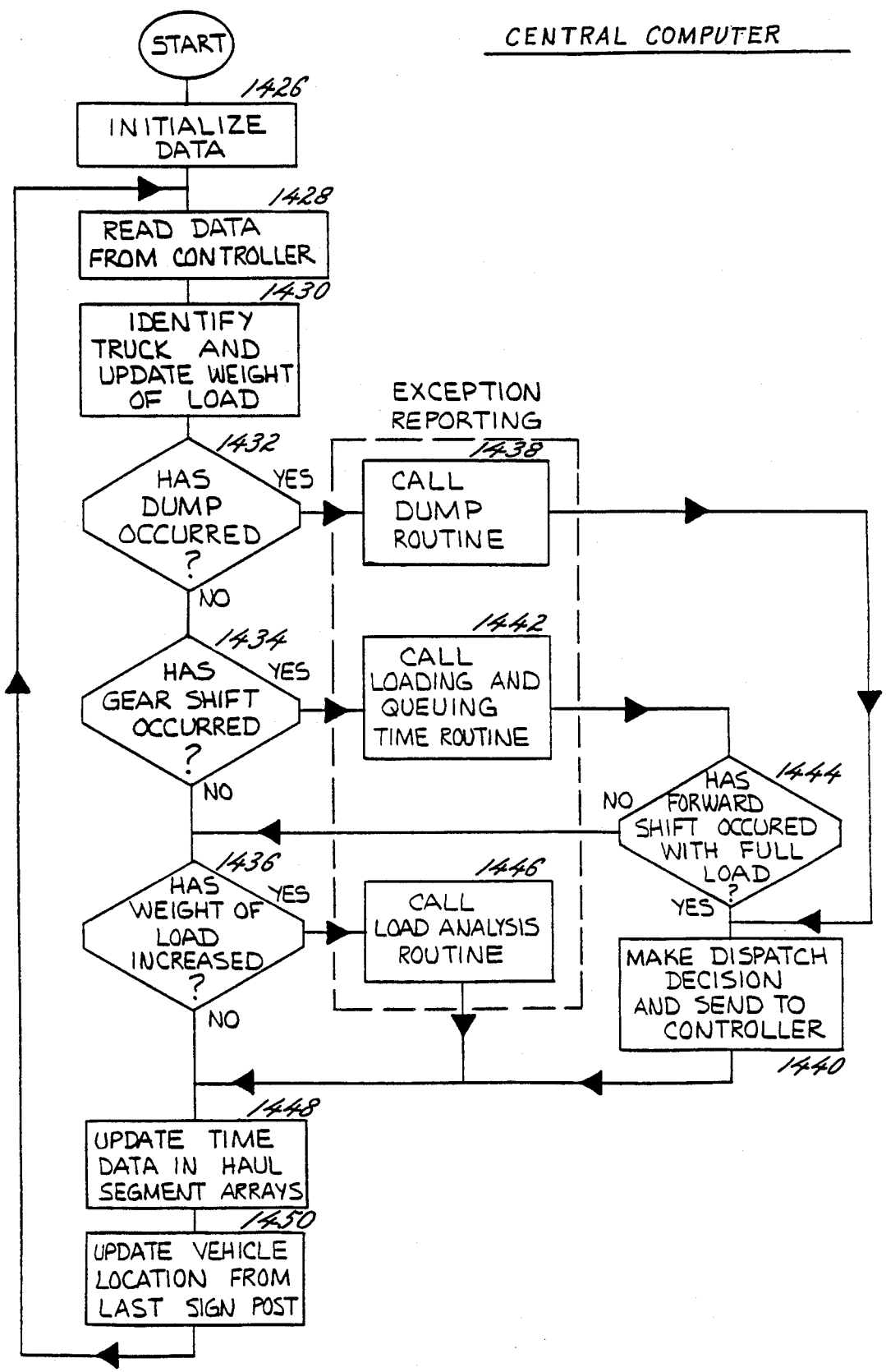

Referring to FIG. 10, the central computer 155d first initializes all its values at step 1426. At step 1428, data received from the RF link is read from the controller 155c by the computer 155d. In order to monitor the vehicles for proper loading, the data read in step 1428 is identified with a particular vehicle in step 1430 and the weight of the vehicle's load is updated if new data is available. Preferably, an operator at the central station is alerted if an overload condition occurs. Of course, other tests can be executed on the weight data, depending upon the relative importance of particular operating parameters in the working environment.

Figure 11:
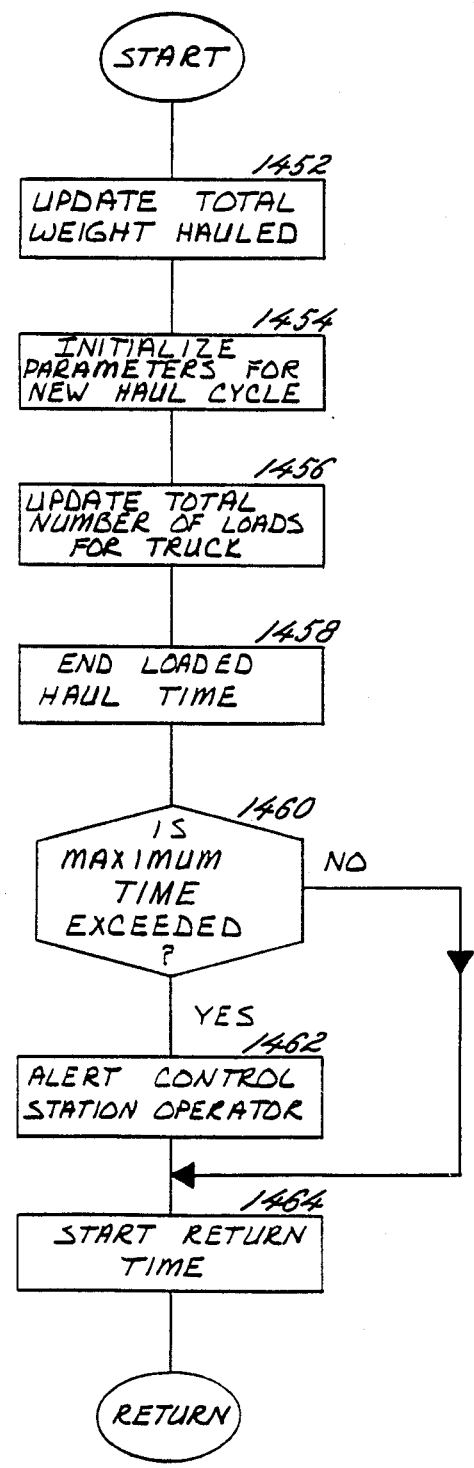

In steps 1432, 1434 and 1436, the data is examined to determine if one of three important events in a hauling cycle have occurred. In step 1432, the data is checked for the presence of a dump signal. If a dump signal is present, the program knows the vehicle is unloading and is ready for a new dispatch command. As explained in greater detail hereinafter, when a dump signal is detected in the received data, the Dump Routine of FIG. 11 is executed by the computer 155d at step 1438. In step 1438, the computer 155d calculates certain hauling cycle values and reports "exceptions" (i.e., values outside predetermined ranges) to the operator of the central station 155. From step 1438, the flowchart moves to step 1440 where the computer 155d makes a dispatch decision as discussed more fully hereinafter. The decision is relayed to the desired vehicle via the controller 155c, modem 155b and the RF link provided by the tranceiver 155a.

If the received data indicates the vehicle has shifted from forward, neutral or reverse, step 1434 branches the flowchart to step 1442 wherein a Loading and Queuing Time Routine is called. This routine, discussed in greater detail in connection with FIG. 12, determines certain values of a haul cycle associated with changes of gear and also reports t the operator of the central station 155 any values that are out of a predetermined range. If the shift data detected in step 1434 is a forward shift and if a full load is carried by the vehicle, step 1444 branches the flowchart to step 1440 where the computer decides which dump site to send the vehicle. In keeping with an important aspect of the invention, a particular dump site may be chosen by the computer 155d in order to control the blend of ore at the site. The selection of a particular dump site will be discussed in greater detail hereinafter.

If the weight of the load has increased in step 1436, the Load Analysis Routine is called in step 1446 wherein loading parameters are updated and out-of-range values are reported.

In each of the routines called in steps 1438, 1442 and 1446, values are calculated for the time segments required for the haul segment arrays of FIGS. 8a-d. These new time segment values are placed into the arrays in step 1448. In step 1450, the position of the vehicle is updated.

The present position of each vehicle may be visualized on a CRT screen or a matrix of individual lights. In keeping with the invention, an operator display (not shown) at the central station 155 is responsive to location data received from each vehicle so as to track the movement of each vehicle relative to the last signpost location. The present location relative to the last signpost is determined by direction data from the on-board compass 116 and distance data from the on-board distance sensor 105. An example of a suitable compass is models 508 or 550 Fluxgate compass sold by Litton Industries, C. Plath North American Division, Annapolis, Md.

In the Dump Routine of FIG. 11, a running total of the weight hauled by each vehicle is updated in step 1452. Because the dumping of a load is chosen to be the end of a haul cycle, the values for hauling cycle parameters are initialized for a new cycle at step 1454. Step 1456 updates the total number of loads for the vehicle and step 1458 ends the time for the current segment of the haul cycle —the loaded haul segment (FIG. 8b). In step 1460, the value of the haul segment time is compared against a predetermined maximum time; if the value exceeds the maximum, the operator of the central station 155 is alerted at step 1462. To start incrementing time for a new hauling cycle, step 1464 starts measuring "return time" or the time for the vehicle to travel from its present location to the location to which it is dispatched.

Figure 12:
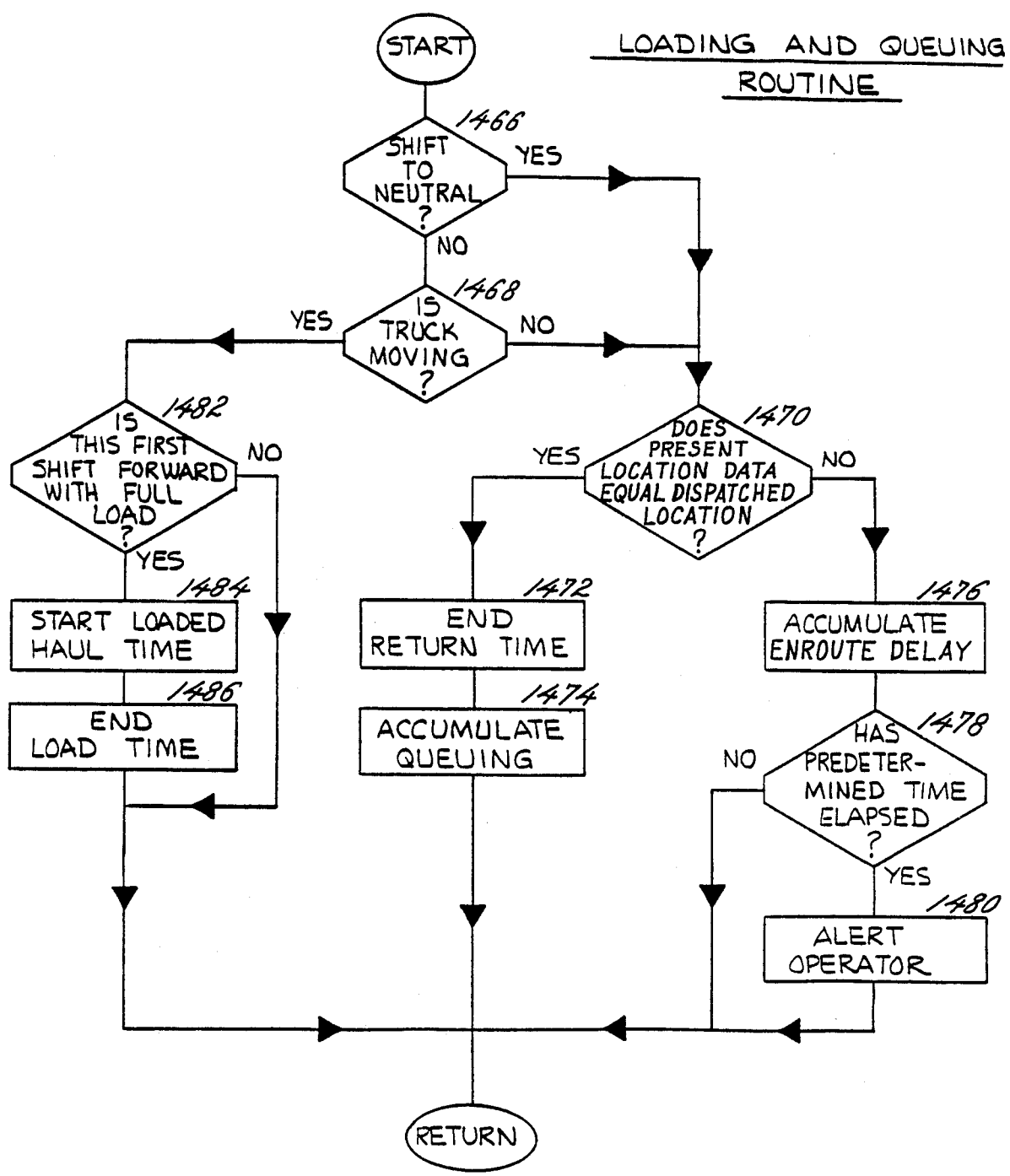

In the Loading and Queuing Routine of FIG. 12, the data indicating a change in gears is used to update hauling cycle data in the primary files of FIGS. 8a-d. In steps 1466 and 1468 the Routine checks to determine if the vehicle is in neutral or if it is moving. If the vehicle is in neutral or if it is in gear but not moving, the flowchart checks the present location data for the vehicle at step 1470. If the present location is the location to which the vehicle has been dispatched by the central station 155, the return time haul segment (FIG. 8c) is calculated at step 1472 and queuing time is initiated at step 1474. By recognizing when a vehicle has reached its intended destination such as a loader 160, the central station 155 can find actual return time for each vehicle—i.e., the time to go from one signpost to another. The time spent waiting at a signpost location is separated from the return time and identified as "queuing" time. Typically, queuing time accumulates while a vehicle is waiting in line at a loader site to be serviced by the loader 160.

If the vehicle is not at its dispatched location in step 1470, enroute delay time is accumulated at step 1476 and the operator of the central station 155 is alerted if the elapsed travel time exceeds a predetermined maximum in steps 1478 and 1480.

If the vehicle is moving in step 1468, the flowchart branches to step 1482 where it is determined whether the shift is a first shift into forward with a full load. If it is a first forward shift with a full load, the loaded haul time segment (FIG. 8b) is started in step 1484 and the loading time segment (FIG. 8a) is ended in step 1486. The accumulated time for the loading time segment is added to the array of FIG. 8a in step 1448 of FIG. 10.

Figure 13:
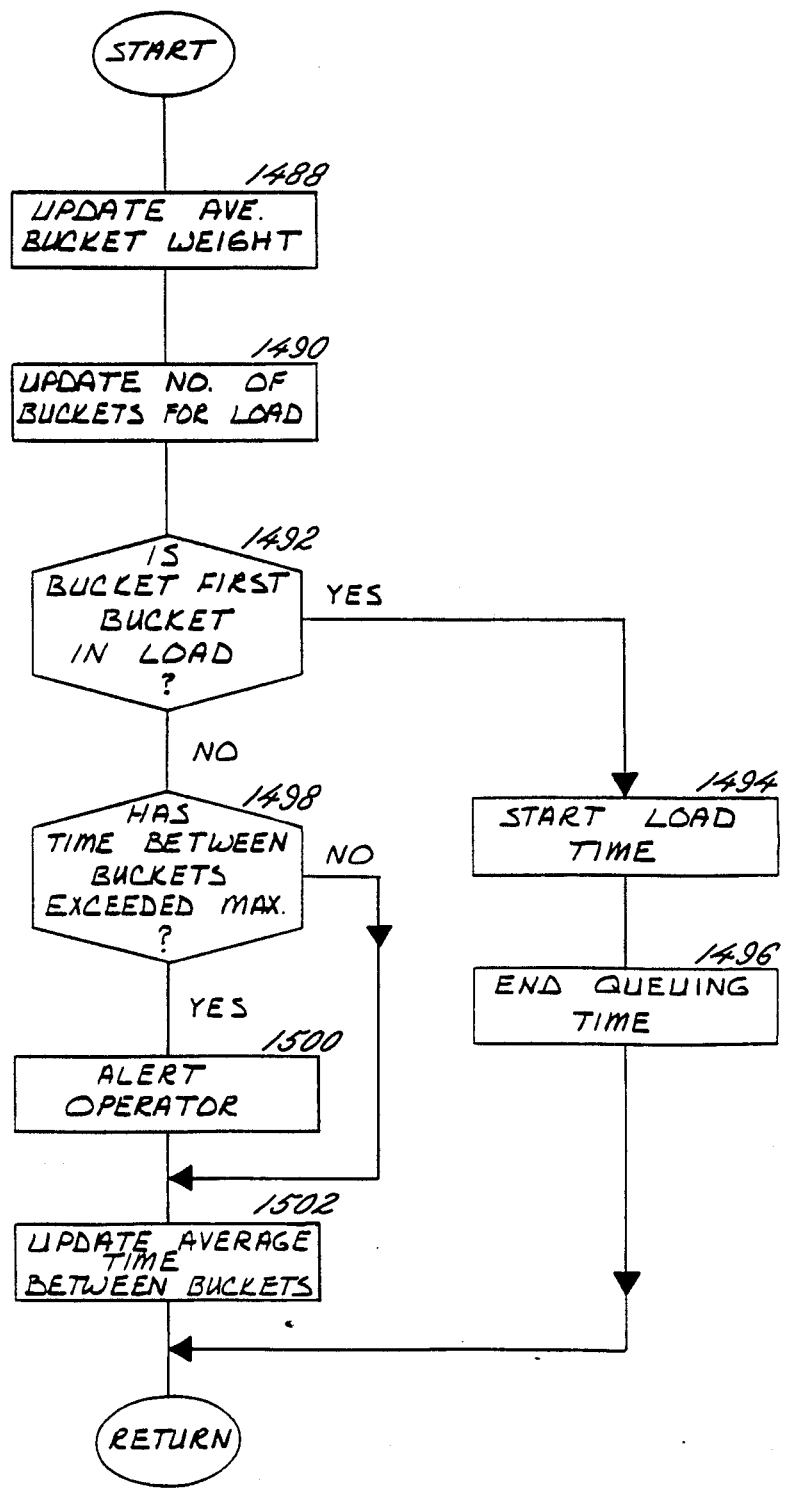
Figure 14:
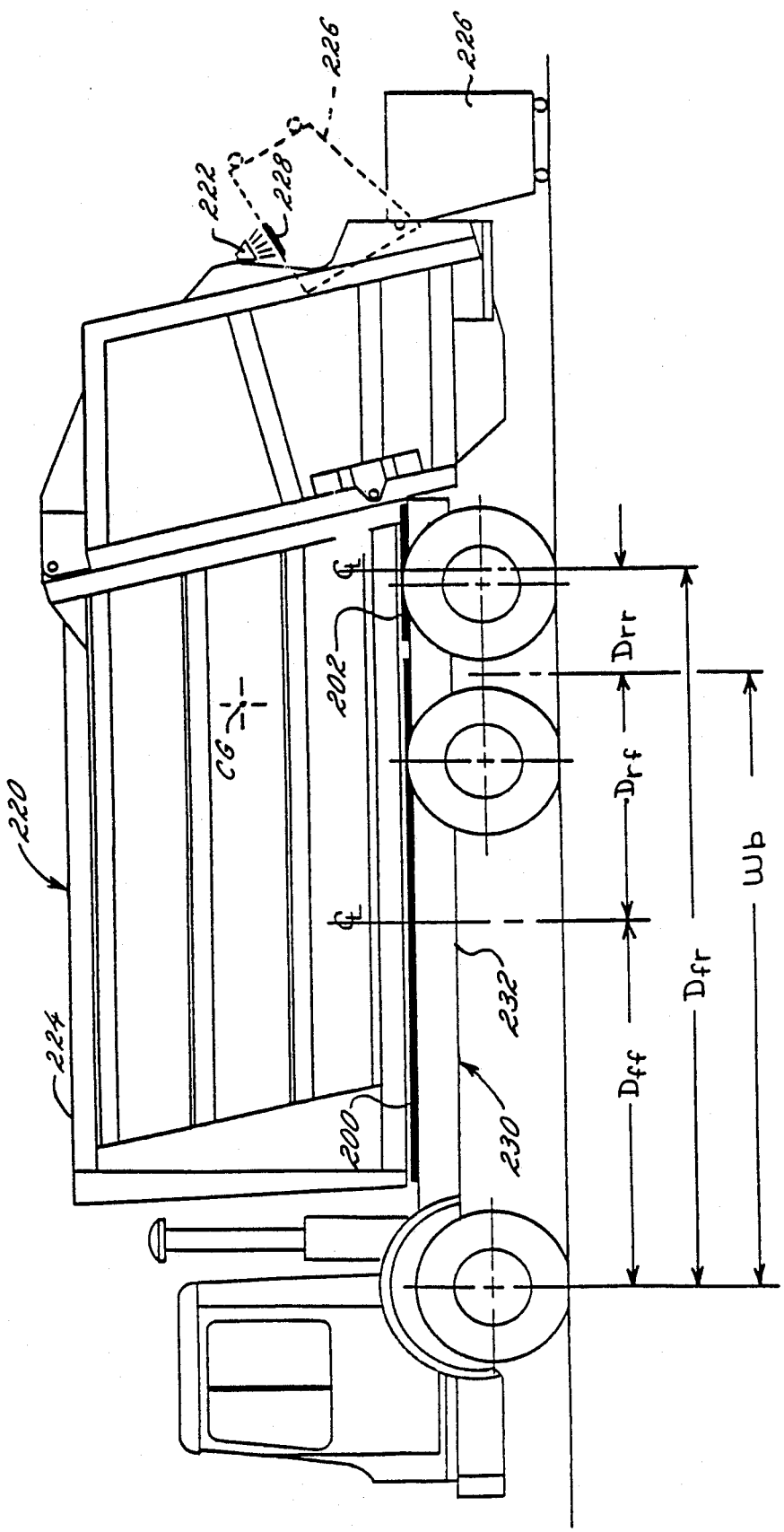
FIG. 14 illustrates a side view of a fixed-body vehicle wherein the body is supported on the frame of the vehicle by an on-board weighing device similar to that illustrated in FIGS. 1 and 1a, and the vehicle includes an on-board apparatus for providing location data according to an alternative embodiment of the invention.

When an incremental increase is detected in the weight data received by the central station 155, the Load Analysis Routine of FIG. 13 is executed. In steps 1488 and 1490, values of loading parameters are updated. Specifically, the incremental increase in weight is used in step 1488 to provide a weight of the bucket added to the vehicle load by the current loader 160. The bucket weight is used to update an average bucket weight for the loader 160. In step 1490, the average number of buckets needed for a full load is updated by tracking the number of incremental weight increases and, when a full load is reached, averaging the total number of buckets for the load with the average from previous loads.

An end of a haul segment is detected if the present incremental increase of weight is based from an empty load condition. In other words, if the present bucket is detected in step 1492 to be the first bucket of a load, the loading time segment is started at step 1494 and the accumulation of queuing time is ended at step 1496. If the current bucket is not a first bucket, the time between buckets is checked to determine if it exceeds a maximum value in step 1498. If the time exceeds the maximum, the operator of the central station 155 is alerted at step 1500. In step 1502, a running average of the time between successive buckets is updated.

Turning now to a more detailed discussion of the dispatch decision made by the computer 155d in step 1440 of FIG. 10, the following discussion is directed to particular algorithms for use by the computer in controlling movement of the trucks 11 in an open-pit mining environment such as that illustrated in FIGS. 4a and 4b.

From its data base, the computer 155d at the central station knows the number of trucks 11 that have been dispatched to a particular loader but have not yet begun loading. The computer 155d also has data indicating if any truck has begun loading at a particular site, but has not completed loading. From the foregoing information, as the trucks 11 become available from a dump site or other areas, the computer 155d executes an algorithm in step 1440 to determine which load area 1−N in FIGS. 4a or 4b will most quickly load the current truck. In keeping with the invention, the computer 155d calculates a "delay" time for each load area 1−N and identifies the load area with the minimum delay as the truck's destination. For each loading area 1−N in FIGS. 4a or 4b the expected delay for the truck 11 leaving DUMP AREA 1 may be determined as follows:

sum of the load times for the trucks enroute to the loading area (n).

The final consideration in determining the delay time (n) is the estimated amount of time for the truck to reach the loading area (n). From the primary files in the data base, the average empty return time can be estimated for trucks of the type to be dispatched from the haul segment array of FIG. 8c. This average empty return time is used as an estimated travel time to loading area (n) for the truck to be dispatched. This time is subtracted from the estimated time which the truck may expect to wait before it can be serviced by the loader 160 at the loading area (n).

For example, two loading areas (n) and (n+1) may have load delays of five minutes and ten minutes, respectively, before considering truck travel time. However, if the travel time to the first loading area (n) is 12 minutes while the second loading area (n+1) has a five minute travel time, this travel time is subtracted from the time delay to arrive at a total delay time which is −7 minutes for the first loading area (n) and +5 minutes for the second loading area (n+1); thus, the computer 155d designates the first loading area (n) as the truck's destination since the minus delay time indicates the time the loader 160 will be waiting 7 minutes for a truck. After the delay of each of the (n) loading areas is calculated, the central computer 155 transmits a dispatch signal at step 1440 in FIG. 10 having data identifying the particular equipment for which the transmission is intended and also having data indicating the $$\text{DELAY}(n) = \begin{matrix} \text{SUM OF} \\ \text{LOAD TIMES} \\ \text{OF ALL TRUCKS} \\ \text{ENROUTE TO} \\ \text{LOAD AREA }(n) \end{matrix} + \begin{matrix} \text{TIME NEEDED} \\ \text{TO COMPLETE} \\ \text{CURRENT LOAD} \end{matrix} - \begin{matrix} \text{ESTIMATED} \\ \text{TRAVEL TIME} \\ \text{OF TRUCK} \\ \text{TO BE} \\ \text{DISPATCHED} \end{matrix}$$

For equation (1) the computer 155d calculates in a conventional manner from available data in its data base the number of trucks in transit to the loading area (n). A calculation of the number of trucks in transit to the loading area (n) is easily derived from available data since the computer 155d identifies which trucks have been directed to a given loading area and have not yet downloaded data indicating loading has begun.

For each truck enroute to a particular loading area (n), the primary file containing load times (FIG. 8a) is accessed in order to provide an estimated load time for trucks of its type (type $T_1$ or $T_2$) The estimated load time is established by averaging the stored load times for the truck type—e.g., $T_1/2$. After an estimated load time is established for each truck enroute to the loading area (n), the load times are summed to provide the first factor in equation (1) for determining delay at the loading area (n).

Added to the sum of the various expected load times is the time estimated to be required to complete the loading of the truck currently being serviced by the loader 160 at the loading area (n). The beginning of loading is detected by the computer 155d when the downloaded data indicates the on-board weighing device has sensed the presence of added weight to the truck body 13. From this available data, the computer 155d calculates the remaining loading time of the truck currently being loaded by simply subtracting the time that has elapsed since loading started from the estimated load time. The difference is added in equation (1) to the particular loader number with the current minimum delay time.

In response to the transmission from the computer 155d, the transceivers 150 of all the trucks 11 lock onto the signal during the sync portion of the transmission and compare the transmitted equipment number to their own numbers. In each truck 11, the MPU 103 of FIG. 3 checks to see if its transceiver 150 is receiving a transmission. If a signal is present, the transmitted equipment number is captured and compared to the truck's own number. When a match occurs between equipment numbers, the computer 155d completes the data transmission to either poll or to dispatch the truck to a loading area (n), dump area (n) or other designated site.

Table 1 illustrates an example of the truck dispatch decision executed by the computer 155d each time a truck becomes available for loading. In the example, there are five loading areas. Applying equation (1) in order to determine the delay time before loading begins at each of the areas, the least busy area is loading area 3. The negative time value at load area 3 indicates the loader 160 at that location will be free to load the truck approximately four minutes before the truck can get to the area. The most busy loading area is loading area 2 which equation (1) indicates has a five minute wait associated with it if the truck is dispatched to that area. In order to make the fleet of trucks the most time efficient, the computer 155d dispatches the truck to loading area 3 because the wait is the shortest for the loader 160 at that area.

If the availabilities of the fleet of trucks and the loaders 160 were balanced, the delay to each of the loading areas (n) would theoretically be zero. Obviously in practice, each of the delays (n) will not always be zero. But, in keeping with the invention, the total system delay should approximate zero when the loading and hauling fleets are properly matched. By matching the availability of loaders and trucks, excessive or insufficient truck/loading equipment capacity can be avoided. In general, the total delay equals, $$\sum_{1}^{N} \text{delay} (n). \quad (2)$$

In the specific example illustrated by TABLE 1, the total delay is, $$\begin{aligned} \text{Total Delay} &= \sum_{1}^{3} \text{delay} (n) \\ &= -2 + 5 - 3 \\ &= 0 \end{aligned} \quad (3)$$

A negative net or total system delay indicates an excess of loading capacity or an insufficiency of hauling capacity. Depending on whether extra trucks are available and other operating parameters, the mine operator can increase the efficiency of the loading equipment by either removing loading equipment or adding trucks. Of course, the size of the loader and truck fleet in operation impacts on how small or large a change in system delay occurs for each addition or subtraction of a piece of hauling or loading equipment.

In summary, the closer the sum of the totals come to zero the more a fleet is in balance. A total of zero for all the delays (n) indicates trucks do not wait for loading equipment to become available and the loading equipment does not wait for trucks to arrive. In the foregoing dispatch logic example, the sum of the totals is zero which indicates the overall system is balanced. If the number becomes too negative, the fleet operator may choose to remove a truck from service or add an additional piece of loading equipment. If the sum becomes too positive in value, the operator may choose to add a truck or remove a piece of loading equipment.

Many operating factors other than which piece of loading equipment will be first available may enter into the decision of where to dispatch a truck after it has completed a haul cycle. For example, it is often important to maintain the percentage composition of certain minerals within a predetermined range. Because the totals in TABLE 1 do not take into account the blend ratios of the ore being mined at the loading area (n) of each piece of loading equipment 160, the dispatching of the trucks 11 will result in a random determination of the ore blend at a particular dump site.

In keeping with the invention, in order to provide a controlled blend of mined minerals, a Blend Ratio Biasing Time may be added to each of the load delays in order to bias selection of the truck dispatch to particular loading areas. More generally, "correction factors" may be added to the load delay for each load area (n) in order that the various parameters may be weighed in the decision to dispatch a truck to a particular load area.

TABLE 1

DISPATCH LOGIC EXAMPLE

| | LOADING AREA NOS. | | |
|---|---|---|---|
| | 1 | 2 | 3 |
| Number of trucks enroute to each loading area | 3 | 4 | 2 |
| Sum of loading times of all trucks enroute to each loading area | 12 | 15 | 7 |
| (Plus) Time needed to complete loading of truck presently being loaded | +1 | +2 | +2 |
| SUBTOTAL | 13 | 17 | 9 |
| (Minus) Travel time from trucks existing location to each loading area | −15 | −12 | −12 |
| DELAY | −2 | 5 | −3 |
| Loading area whose equipment will be waiting for truck and time of wait | −2 | | −3 |
| Loading area at which truck will have to wait and time of wait | | 5 | |

Beside blend ratio, some other hauling parameters that may be considered are (1) cross pit travel biasing times, (2) enhanced (dynamic) cross pit travel bias times, (3) specific loading equipment or pit biasing times, (4) specific dump area biasing times, (5) stripping ratio biasing times, (6) truck tire ton-mile-per-hour (TMPH) biasing times, (7) minimization of truck travel biasing times, and (8) truck queuing time biasing times. Each one of these biasing times may be successively applied to the basic dispatch logic decision from TABLE 1 to arrive at a weighted dispatch decision which takes the foregoing parameters into account.

The Blend Ratio Biasing Factors for load areas (1), (2) and (3) are determined as set forth in the following particular example. As a beginning, the central computer 155 is provided with data of the various mineral percentages desired for the ore being mined. In TABLE 2, the ingredients A, B, C and D are provided with optimum values and upper and lower limits.

TABLE 2

| | Ingredient | | | |
|---|---|---|---|---|
| | A | B | C | D |
| Lower Limit | 2.00% | 5.65% | 5.75% | 4.50% |
| Optimum | 3.00% | 6.00% | 7.00% | 5.25% |
| Upper Limit | 4.00% | 6.35% | 8.25% | 6.00% |
| Range | 2.0% | .7% | 2.5% | 1.5% |

From testing at the various loading areas (1), (2) and (3), the actual percentage content of each mineral at each area is known. These values and their deviation from the optimum value (in TABLE 2) are entered into the memory of the computer 155d at the central station, and they are organized in a manner such as shown in TABLE 3.

TABLE 3

| Loading Area | | INGREDIENT | | | |
|---|---|---|---|---|---|
| | | A | B | C | D |
| 1 | Actual Blend | 2.5% | 5.0% | 4.25% | 6.0% |
| | Deviation From Optimum | −.5% | −1.0% | −2.75% | +.75% |
| 2 | Actual Blend | 4.0% | 4.5% | 8.0% | 5.5% |
| | Deviation from Optimum | +1.0% | −1.5% | +1.0% | +.25% |
| 3 | Actual Blend | 3.0% | 7.0% | 8.0% | 4.0% |
| | Deviation from Optimum | 0% | +1.0% | +1.0% | −1.25% |

As loads are hauled, the computer 155d has sufficient information to compute the amount of each critical ingredient hauled to a particular dump area (n) (the amount equals the tons of ore hauled multiplied by the percentage of each critical ingredient A, B, C or D).

For each dump area (n), a record of the ore dumped at the area is kept by the computer 155d. The data may be arranged for storage as illustrated by TABLE 4. Data from each new load dumped by a truck 11 at the particular dump area is added to TABLE 4 as the load is delivered. Because each load may be from any one of the loading areas (n) and probably has a different weight than previous loads, the percentage of ingredients A, B, C and D may differ in total tons. In order to keep an accurate record of the current composition of the ore at each dump area (n), the computer 155d updates the percentage of each ingredient at the dump area with the addition of each new load. For example, in TABLE 4 the first load to dump area (n) is from loading area (1).

From the data in TABLE 3, the computer 155d knows the actual blend for each of the ingredients. From the on-board weighing device, the computer 155d knows the total weight of the ore carried by the truck 11. From this available data, each of the columns in TABLE 4 can be completed. Specifically, for the first load from the loading area (1), the size of the load is indicated from the on-board weighing device to be 128 tons (column 1). Because this load is the first load to the dump area (n), the "Running Total" is also 128 tons (column 2). For each of the ingredients of interest—A, B, C and D—a column is provided which sets forth the tonnage of the ingredient in the current load, the running total of the ingredient at the dump area (n) and the running total percentage of the ingredient with respect to the running total of the ore hauled to the area.

TABLE 4

| Loading Sites Hauled From | Size of Loads Hauled Tons | Running Total Hauled Tons | INGREDIENT | | | |
|---|---|---|---|---|---|---|
| | | | A | B | C | D |
| 1 | 128 | 128 | 3.2/3.2 2.5% | 6.4/6.4 5.0% | 5.4/5.4 4.2% | 7.7/7.7 6.0% |
| 3 | 165 | 285 | 5.0/8.2 2.88% | 11.6/18.0 6.32% | 13.2/18.6 6.53% | 6.6/14.3 5.02% |
| 1 | 85 | 370 | 2.1/10.3 2.78% | 4.3/22.3 6.03% | 3.6/22.2 6.00% | 5.1/19.4 5.24% |
| 2 | 115 | 485 | 4.6/14.9 3.07% | 5.2/27.5 5.67% | 9.2/31.4 6.47% | 6.3/25.7 5.30% |
| 2 | 80 | 565 | 3.2/18.1 3.20% | 3.6/31.1 5.50% | 6.4/37.8 6.69% | 4.4/30.1 5.33% |
| 3 | 175 | 740 | 5.3/23.4 3.16% | 12.3/43.4 5.86% | 14.0/51.8 7.00% | 7.0/37.1 5.01% |
| 1 | 135 | 875 | 3.4/26.8 3.06% | 6.8/50.2 5.74% | 5.7/57.5 6.57% | 8.1/45.2 5.17% |
| 2 | 110 | 985 | 4.4/31.2 3.17% | 5.0/55.2 5.60% | 8.8/66.3 6.73% | 5.5/50.7 5.15% |

With the running total percentage of each ingredient known from TABLE 4, the actual percentage of each ingredient at the dump area (n) can be compared with the optimum percentage which is entered into the data base of the central computer 155 and is shown in TABLE 2. The comparison between the actual running total percentage and the optimum or ideal percentage is illustrated in TABLE 5 for each important ingredient A, B, C and D. For example, ingredient A has a composite running total percentage of 3.17% from the last load to the dump area (n) as can be seen from the last row in TABLE 4. The variance of the percentage content of ingredient A from the optimum percentage (TABLE 2) is 0.17%. As indicated in TABLE 2, acceptable range of the actual percentage content of ingredient A is 2.0%.

By dividing the actual percentage variance from the optimum percentage content by the acceptable percentage range of ingredient A, the percent of the total range represented by the variance can be determined. For the example in the tables, these values are the "Percent Of Range" values in TABLE 5. For ingredient A, the 0.17% variance represents 8.5% of the total range. But, the variance of ingredient B represents 57.1% of the total range for ingredient B. Because the optimum percentage of ingredient B is at the center of the acceptable range, the computer 155d knows that the percentage of ingredient B at the dump area (n) exceeds either the upper of lower limit of the acceptable range for that ingredient. Because the variance from optimum for ingredient B is a negative number, the composite running total percentage is known to be less than the minimum percentage content of 5.65%. The same percent of range calculations are made for ingredients C and D.

TABLE 5

| | INGREDIENT | | | |
|---|---|---|---|---|
| | A | B | C | D |
| Composite Running Total Percentage Blend | 3.17% | 5.60% | 6.73% | 5.15% |
| Variance From Optimum Percentage Blend | +.17% | −.40% | −.27% | −.10% |
| Percent of Range | 8.5% | −57.1% | −10.8% | −6.67% |
| Ingredient Loading Site Priority | 1 | 3 | 2 | 1 |

From the percent of range numbers for each ingredient, each ingredient is associated with a loading area (1), (2) or (3) whose actual percentage of that ingredient will tend to bring the content of the ingredient at the dump site toward its optimum value by reducing the value of the "Percent Of Range". For example, ingredient A has a positive 8.5 Percent Of Range. To reduce the percentage amount of that ingredient, the central computer 155 identifies from the data in TABLE 3 the loading area with the least percentage of ingredient A. The data in TABLE 3 indicates loading area (1) has the least amount of ingredient A—2.5%.

Because the dump area has too small of a percentage of ingredient B, the computer 155d finds the loading area with the greatest percentage amount of that ingredient—loading area (3). For ingredient C, either loading area (2) or (3) may be given priority since both have 8.0 percentage of ingredient C. There is too little of ingredient D, so the loading area to be given priority is loading area (1).

In TABLE 1, the delay (n) for each of the loading areas is determined in minutes. For dispatching based on minimum delay time, the computer 155d identifies in step 1440 of FIG. 10 the loading area with the least delay. In order to bias this basic dispatch logic toward certain loaders so that the percentage of each ingredient may be brought closer to its optimum value, a numerical value is assigned to each delay (n) before the computer 155 identifies a minimum delay. The absolute magnitudes of these numerical values must be empirically determined for each mine site; but the relative magnitudes are determined from the Percent Of Range values in TABLE 5. In TABLE 6, each of the absolute values for the "Percent Of Range" is divided by 100 and associated with the appropriate loading area. Specifically, the −57.1% value for the "Percent Of Range" becomes 0.77 and this latter value is associated with loading area (3) as a biasing factor. Ingredient C splits its biasing factor of 0.10 between loading areas (2) and (3). The biasing factors for ingredients A and D are both associated with loading area (1).

TABLE 6

| INGREDIENT DESIGNATION | LOADING SITE | | |
|---|---|---|---|
|  | #1 | #2 | #3 |
| A | .09 |  |  |
| B |  |  | .57 |
| C |  | .05 | .05 |
| D | .07 |  |  |
| TOTAL BIASING FACTOR | .16 | .05 | .62 |

From the total biasing factors for each loading area in TABLE 6, it can be seen that loading area (3) has the largest value for its total biasing factor. The total biasing factor considers all the ingredients A, B, C and D. In order to bias the delay time toward loading area (3), the highest total delay −0.62 for loading area (3) is used as a base number from which the total biasing factor for each loading area is subtracted. Of course, loading area (3) is left with a zero resultant. But, load areas (1) and (2) are left with values that are added to their delay times calculated in TABLE 1, thereby making these areas less likely to have the minimum time when the central station 155 identifies the loading area to dispatch a truck 11. Specifically, referring to TABLE 7, the delays for loading areas (1) and (2) from TABLE 1 are added to the amounts 0.46 and 0.57, respectively. The added delay for loading area (3)—the area we want to bias most heavily toward—has a value of zero.

TABLE 7

|  | LOADING AREA | | |
|---|---|---|---|
|  | 1 | 2 | 3 |
| SINGLE HIGHEST BIASING FACTOR | .62 | .62 | .62 |
| BIASING FACTOR FOR EACH AREA | −.16 | −.05 | −.62 |
| ADDED TIME | +.46 | +.57 | +0 |
| DELAYS FROM TABLE 1 | −2 | 5 | −3 |
| BIASED DELAYS | −1.54 | 5.57 | −3 |

In the biased dispatch example illustrated by TABLES 1–7, the computer 155d will still choose loading area (3) as the destination for the truck 11 leaving a dump area (n). But it can be appreciated from the example that the additional delay times generated from the biasing factors may under certain circumstances cause the computer 155d to dispatch the truck 11 to a loading area (n) whose true loading time is actually not the shortest time available. These additional delay times can be factored as required to achieve meaningful blending results e.g., of 1.2, 1.4, etc.

Another example of a use for biased dispatch is in open-pit mining operation where multiple pits are present and where the mine operator wishes to limit cross-pit dispatching of the trucks. Specifically, without biasing the dispatch decision, the computer 155d may dispatch a truck in pit A to a loading site in pit B. Even though the truck may be loaded the fastest at the loading site in pit B, the truck must travel a considerable longer distance to arrive at the loading area. Because the trucks 11 represent a very large fraction of capital expenses at an open-pit mining operation, as previously discussed, an operator may wish to bias the dispatching of the truck fleet to discourage cross-pit travel. By minimizing cross-pit travel the mine operator is sacrificing some ability to balance the use of the truck fleet and loading equipment.

Referring to TABLE 8, the same delay values found in TABLE 1 are repeated. Therefore, the loading area with the least delay time is loading area (3) as before. But, in TABLE 8 loading area (3) is in the south pit of the mine site and for this example we assume the truck to be dispatched has indicated in its downloaded data that it is at a dump area (n) associated with the north pit.

TABLE 8

|  | LOADING AREA | | |
|---|---|---|---|
|  | NORTH PIT | | SOUTH PIT |
|  | 1 | 2 | 3 |
| Number of trucks enroute to each loading area | 3 | 4 | 2 |
| DELAY FROM TABLE 1 (Plus) | −2 | 5 | −3 |
| Dump site/truck location to loading equipment correction factor | +0 | +0 | +5 |
| TOTAL | −2 | 5 | +2 |

In order to discourage cross-pit travel of the truck fleet, the computer 155d adds a predetermined time delay to the actual delays calculated for the loading areas in the pit or pits which the truck to be dispatched is not in. In the example shown in TABLE 8, the delay of loading area (3) is increased by five minutes. This heavy biasing of the loading area in the south pit causes the computer 155d to dispatch the truck to loading area (1), even though loading area (3) would provide the fastest load time.

As indicated earlier, the dispatch decision can be biased to account for multiple hauling parameters. Accordingly, the actual delay may first be biased to account for a proper blend of ore as illustrated in TABLES 1-7 and then biased to account for cross-pit travel as illustrated in TABLE 8. Many other hauling parameters may be factored into the dispatch decision by weighting the delay times in a manner similar to that illustrated in TABLES 1-8.

Turning now to an alternative embodiment of the invention, signposts fixedly located throughout a working site may be implemented by passive devices such as bar codes. In FIG. 14, a rear-loading garbage truck 220 includes a laser bar code reader 222 strategically mounted to the vehicle body 224 so when a dumpster 226 is lifted by a conventional loading mechanism (not shown) and its contents dumped into the body (as shown in dashed line), a bar code 228 mounted on the side of the dumpster is brought within sensing distance of the laser bar code reader.

As in the embodiment of FIGS. 1-13, the location data may be used in connection with other data retrieved from on-board sensors to establish a data base from which vehicle commands may be generated and vehicle performance may be evaluated. In FIG. 14, the on-board weighing device of FIGS. 1 and 1a is placed between the body 224 and the frame 230 of the vehicle. Preferably, the fluid-filled tubing comprising the on-board weighing device includes two sections 200 and 202 on each beam member 232 of the frame.

Inasmuch that the side view of FIG. 14 only allows illustration of one beam member 232 and one set of fore and aft fluid-filled tubings 200 and 202, respectively, it will be appreciated that the symmetrical nature of the garbage truck provides for a mirror-image configuration of the weighing device on the side of the vehicle not shown in FIG. 14.

Preferably, the fluid-filled tubing extends along substantially the entire length of the interface between the vehicle frame member 232 and body 224. For reasons explained hereafter, the tubing is broken into fore and aft sections 200 and 202. Preferably, the tubing supports the entire weight of the body 224 on the frame members 232.

In rear-loading garbage trucks such as the illustrated vehicle 220, the loading mechanism typically extends substantially beyond the end of the frame 230 of the vehicle. Consequently, the center of gravity (CG) of the body 224 is located toward the back of the vehicle body as generally demarcated by the point CG in FIG. 14. In order to prevent the pressure sensor assembly from providing a distorted reading, the length of tubing supported on each beam member 232 of the frame of the vehicle is divided into two sections. The length of the forward section 200 is selected such that the center line $C_L$ for the section is always forward of the center of gravity CG. In complementary fashion, and the center line $C_L$ for the aft section 202 is always rearward of the center of gravity CG. The foregoing restrictions on the length of the two sections of tubing assures that transfer of weight from the body 224 to the frame member 232 is distributed along the length of the tubings 200 and 202.

Because the center of gravity, CG, is located toward the rear of the vehicle 220, the forward tubing 200 is considerably longer than the aft tubing 202. But, it will be appreciated that other configurations of bodies (such as a front-loading body) may be characterized by locations of the body's center of gravity, CG, that alter the length relationship between the forward and aft tubings 200 and 202, respectively.

Because the forward tubing 200 is much longer than the aft tubing 202 in FIG. 14, the pressure change for a given change in weight is different for each length of tubing. In order to relate the voltage changes in each pressure sensor connected to each tubing (the pressure sensors are the same type of sensors as pressure sensors 51a-d in FIG. 2), the ratio of the contact areas between the tubing and the body for the two portions 200 and 202 is used to provide an adjusted voltage from the pressure sensor associated with the shorter tubing which is the aft tubing 202 in the illustration. The adjusted voltage may be expressed as $$\Delta V_R \text{ (adjusted)} = \Delta V_R \cdot P_F \qquad (4)$$

where $P_F$ equals the ratio of the contact areas of the forward and aft tubings 200 and 202, respectively, and $\Delta V_R$ is the raw voltage from the pressure sensor associated with the aft tubing 202.

In order to determine the weight on the front and rear axles, simple moment arm calculations are made about each axle. For the situation shown in FIG. 14 where the center line $C_L$ of the aft tubing 202 is behind the rear axle, the moment arm equations are that of a third class lever arm. Therefore, the moment about the rear axle may be expressed as, $$\Delta V_1 \text{ (Front axle)} = \Delta V_F \cdot \frac{D_{RF}}{W_B} - \Delta V_R \text{ (adjusted)} \cdot \frac{D_{RR}}{W_B} \qquad (5)$$

where $\Delta V_F$ is the sum of the raw voltages from the pressure sensors associated with the two forward tubings 200 supporting the vehicle body 224 and $\Delta V_R$ (adjusted) is the sum of the adjusted voltages from the pressure sensors associated with the two aft tubings 202. $D_{RF}$ is the distance between the rear axle and the center line $C_L$ of the foreward tubing 200 in FIG. 14, and $D_{RR}$ is the distance between the rear axle and the center line $C_L$ of the aft tubing 202 in FIG. 14. Solving for $\Delta V_1$ in equation (5) will give the voltage that when converted to weight is the weight on the front axle. The denominator value WB is the wheel base of the vehicle 220 as indicated in FIG. 14.

For the weight over the rear axle, a simple moment arm equation is set up about the front axle, and it may be expressed as, $$\Delta V_2 \text{ (Rear axle)} = \Delta V_F \cdot \frac{D_{FF}}{W_B} + \Delta V_R \text{ (adjusted)} \cdot \frac{D_{RF}}{W_B} \qquad (6)$$

where $D_{FF}$ is the distance from the center line $C_L$ of forward tubing 200 to the front axle of the vehicle 220 in FIG. 14, and $D_{FR}$ is the distance from the front axle to the center line $C_L$ of the aft tubing 202. Solving for $\Delta V_2$ gives a voltage that when converted to weight is equal to the weight on the rear axle.

It will be appreciated that the foregoing moment equations are for a third class lever since the center of the aft tubing 202 is behind the rear axle of the vehicle 220 in FIG. 14. IF the center line $C_L$ of the aft tubing 202 is forward of the rear axle, the system is modeled as a second class lever and the equations should be modified accordingly.

The total weight of the body 224 can be found by summing the voltages representing the weights over the front and rear axles $$\Delta V_T = \Delta V_1 + \Delta V_2 \qquad (7)$$

and converting the total voltage $V_T$ to a weight measurement.

Figure 15:
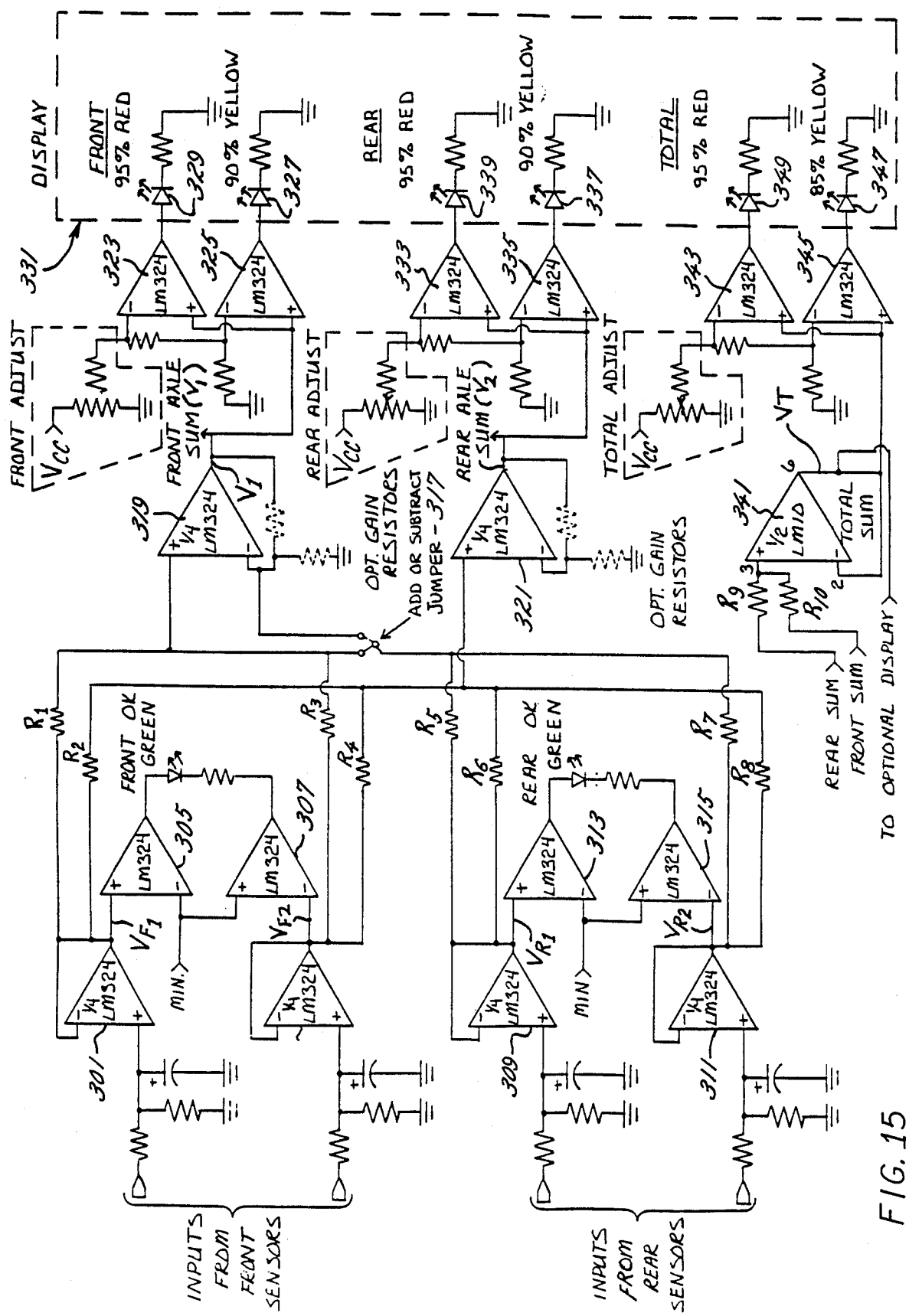
FIG. 15 is a schematic diagram of a sensor processing unit for receiving and processing load data from the on-board weighing device associated with the vehicle illustrated in FIG. 14.

In order to provide front and rear axle weight readings and total weight readings in accordance with equations 4 through 7, a circuit made up of discrete operational amplifiers is preferably used if data recording or downloading is not required. Such a circuit is shown in FIG. 15. If data is to be recorded and downloaded to the central station 155, the sensor processing unit 101 in FIG. 3 is fed by the op-amp circuitry as shown in FIG. 15.

Turning first to FIG. 15, each of the on-board weighing devices 200 and 202 on each side of the vehicle 220 is assumed to have one pressure sensor associated with it. Specifically, the two front onboard weighing devices 200 (only one of which is shown in FIG. 14) have two corresponding pressure sensors (such as those labeled 51a-d in FIG. 3) that provide two voltages to the circuitry of FIG. 15. Likewise, the two rear on-board weighing devices 202 have two corresponding pressure sensors that provide two voltages to the circuitry of FIG. 15. The particular operational amplifier circuit illustrated in FIG. 15 is for the situation where the forward and aft tubings 200 and 202 are of equal lengths. Certain obvious design modifications would be required for tubings of different lengths.

The voltages from the front sensors are received by operational amplifiers 301 and 303 in a buffer or unity-gain amplifier configuration. Operational amplifiers 305 and 307 are in comparator configurations and receive the unity-gain output from the op-amps 301 and 303, respectively. A reference voltage (MIN) is provided to the comparators 305 and 307 in order that a green LED mounted to the housing for the circuit of FIG. 15 is always lit when the voltage from the front sensors is greater than a predetermined minimum voltage. By providing a check for minimum voltage from the front sensors, the vehicle driver can easily verify the front sensors are correctly functioning when the green LED is lit.

The foregoing arrangements of operational amplifiers is duplicated for the voltages from the sensors for the rear on-board weighing devices 202. Specifically, operational amplifiers 309 and 311 are configured as unity-gain amplifiers or buffers that receive the voltages from the rear sensors in a conventional manner. Operational amplifiers 313 and 315 are configured as comparators in order to determine if the voltage from the two rear sensors exceed a minimum predetermined value. A green LED is also provided for the rear sensors.

The voltages $V_{F1}$, $V_{F2}$, $V_{R1}$ and $V_{R2}$ at the outputs of each of the buffer op-amps correspond to the voltages from the load sensors associated with the four fluid-filled tubings 20 and 202. By summing these voltages in a manner corresponding to the moment equations (4) through (7), a value for front and rear axle weight and total weight may be calculated. In order to implement the equations, the values of resistors $R_1$ through $R_{10}$ should correspond to the following load dimension ratios:

$R_1$ = Front axle load/total load $R_2$ = Rear axle load/total load $R_3$ and $R_6$ = Distance from $C_L$ of aft tubing 202 to front axle/wheel base $R_4$ and $R_5$ = Distance from $C_L$ of aft tubing 202 to rear axle/wheel base $R_7$ and $R_{10}$ = Distance from $C_L$ of forward tubing 200 to rear axle/wheel base $R_8$ and $R_9$ = Distance from $C_L$ of forward tubing 200 to front axle/wheel base Depending on whether the system is a second or third class lever as discussed above, the jumupper connection 317 is strapped to either the plus or minus input of a summing amplifier 319 in order to provide the voltage $V_1$ (equation 5), corresponding to the weight of the front axle. For the voltage $V_2$ corresponding to the weight over the rear axle (equation 6), summing amplifier 321 receives the voltage $V_{F1}$, $V_{F2}$, $V_{R1}$ and $V_{R2}$ via resistors $R_2$, $R_4$, $R_6$ and $R_8$, respectively. Because the moment equation about the front axle is the same for both second and third class levers, there is no need for a jumper connection similar to that associated with summing amplifiers 319.

A pair of operational amplifiers 323 and 325 in comparator configurations compare the voltage $V_1$ with predetermined reference voltages in order to activate LEDs 327 and 329 mounted on a panel display 331 inside the cab of the vehicle 220. The LEDs 327 and 329 indicate when the load over the front axle has reached 90% and 95% of maximum allowable load. Similarly, operational amplifiers 333 and 335 are in comparator configurations for comparing the voltage $V_2$ with predetermine voltages representing 90% and 95% of the maximum load for the rear axle. LEDs 337 and 339 are provided on the panel display 331 and are responsive to op-amps 335 and 333.

Finally, summing amplifier 341 receives the voltages $V_1$ and $V_2$ and provides an output voltage $V_T$ that corresponds to the total weight of the body 224. As with the front and rear axle weights, comparators 343 and 345 provide indications of when the total weight exceeds predetermined maximum total weights (e.g., 85% and 95% in FIG. 15). LEDs 347 and 349 provide a visual display on the display panel 331.

For a system according to the invention wherein the location data retrieved from the bar codes is used in connection with front and rear axle and total weight measurements in order to generate a data base from which command signals may be generated, the sensor processing unit 101 of FIG. 3 is fed by the circuit of FIG. 15. FIG. 16 illustrates a block diagram of the hardware necessary to implement the invention on the garbage truck 220 of FIG. 14.

Referring to FIG. 16, the system for downloading data from the garbage vehicle 220 is identical to the system shown in FIG. 6, except the IR transceivers are replaced by the bar code 228 and the laser bar code reader 222. In similar manner as the sensor block 350 in FIG. 6, sensors 351 include the on-board sensors shown in FIG. 2 such as the on-board weighing device comprising the pairs of fluid-filled tubings 200 and 202. In addition, the circuit of FIG. 15 may be included in the sensors block 351 in order to provide additional analog data to the sensor processing unit 101. This data plus location data from the bar code reader 222 are organized by the processor and transferred to an on-board RF transceiver 150 via a modem 352.

As in FIG. 6, the link between each on-board processor 101 and the central station 155 is provided by a data link similar to the Telxon RF/FM Data Communication System of Telxon Corporation, 3330 W. Market St., Akron, Ohio 44313. At the central station 155, the transceiver 155a modem 155b and controller 155c are the same as those in FIG. 6. The computer 155d executes software for monitoring and controlling the garbage vehicles in a manner similar to the flowchart diagrams of FIGS. 10-13 for the open-pit mining environment. Unlike the open-pit mining environment, the dispatch decision is considerably simplified since most garbage vehicles follow a predetermined route. But, it will be understood that the tracking of vehicle location and the execution of exception reporting steps are similar to that of the open-pit mining environment.

It will be appreciated from the foregoing description, that the invention provides a means for locating a vehicle in its working environment and correlating values of predetermined operating parameters recorded by on-board sensors with the location data so as to provide data files such as the four primary files of FIGS. 8a-8d. From these files, each vehicle can be controlled so that the fleet as a whole obtains a desired goal in the most effective and efficient manner. In addition, a central station that receives data from each vehicle can monitor certain operating parameters and report to an operator when values for these parameters are outside a range of accepted values. By providing such "exception reporting", the operator can be alerted to situations that if left uncorrected may potentially damage the vehicle.

I claim:

1. A system for identifying a location of a material hauling vehicle within a network of temporary destinations and assemblying data related to the performance of said vehicle in coordination with each identified location, said system comprising:
   a plurality of signposts, each located at one of said temporary destination of said vehicle;
   a detection device on board said vehicle for detecting said signposts and generating data indicative of vehicle location;
   a sensing device on board said vehicle for providing data indicative of at least one hauling condition of said vehicle;
   a memory device for recording data from said detection and sensing devices; and
   means for (1) receiving data from said sensing and detection devices and in response thereto, (2) grouping said data in said memory such that at least some of said data indicative of a hauling condition is associated with each detected location, (3) processing said data in order to determine the future movement of said vehicle that best achieves a predetermined goal and (4) providing said vehicle with information for directing said future movement.

2. A system as set forth in claim 1 wherein each of said plurality of signposts includes an infrared transmitter.

3. A system as set forth in claim 1 wherein each of said plurality of signposts includes a bar code and said detection device is a laser bar code reader mounted to said vehicle.

4. A system as set forth in claim 2 including a RF transmitter responsive to said sensing and detection devices for downloading location and hauling condition data to a receiver associated with said means located at a fixed and remote location.

5. A system as set forth in claim 1 wherein said means includes, a first RF transceiver responsive to said location and hauling condition data from said sensing and detection devices for downloading said data to a fixed and remote location;
   said fixed and remote location including a second RF transceiver for receiving said location and hauling condition data and a first processor for formulating in response thereto control signals for transmission to said vehicle; and
   a second processor means on board said vehicle for responding to said control signals and providing said information for directing future movement to the operator of said vehicle by way of a display.

6. A system as set forth in claim 7 wherein said sensing device also includes:
   a compass for generating data indicative of the heading of said vehicle;
   a distance sensor for generating data indicative of distance traveled by said vehicle; and
   said means responding to said distance and heading data to find the approximate instantaneous position of said vehicle relative to a predetermined location associated with the most recently detected signpost data.

7. A system as set forth in claim 1 wherein said sensing device includes means for weighing a payload carried by said vehicle.

8. A system as set forth in claim 7 wherein said weighing means includes,
   a pressure sensor assembly distributed along the length of a frame portion of said vehicle such that the entire weight of a body portion of said vehicle is transferred to the frame through the pressure sensor assembly so as to distribute the weight of the body substantially uniformily along an interface between the vehicle body and frame.

9. A system as set forth in claim 8 including a processor means on board said vehicle and responsive to said pressure sensor assembly for determining when the front, back or total weight of said vehicle body exceeds predetermined maximum values.

10. In a system for controlling the routing of each vehicle in a fleet of material-hauling vehicles to one of a plurality of possible locations within a working area, an apparatus for monitoring and commanding vehicle movement comprising, in combination:
    signposts strategically located within said working area for providing location data;
    a first sensor on-board each of said vehicles for sensing a vehicle parameter and forming data indicative of said vehicle's hauling status in response thereto;
    a second sensor on-board each of said vehicles for sensing location data from one of said signposts;
    first means for transferring said location and hauling status data to a central computer;
    said central computer for receiving said location and hauling status data from each of said vehicles and including means for (1) constructing a data base from said data, (2) formulating vehicle control data in accordance with a predetermined objective; and
    second means for transferring said vehicle control data to at least one selected vehicle to thereby provide routing instructions to said at least one selected vehicle so as to implement said predetermined objective.

11. In a system as set forth in claim 10 wherein said control data includes data designating load or dump sites and each of said vehicles includes display means responsive to said control data for displaying the load or dump site to the vehicle operator.

12. In a system as set forth in claim 10 wherein each of said vehicles includes a pivotal body mounted on a frame for movement between raised and lowered positions and said first sensor includes a weighing device mounted to said frame for supporting the entire weight of said body in its lowered position and providing data indicative of weight.

13. In a system as set forth in claim 12 wherein said weighing means is a pressure sensor assembly comprising at least one length of fluid-filled tubing mounted on a beam member of said frame.

14. In a system as set forth in claim 13 wherein said fluid-filled tubing is mounted on said beam member such that it forms an interface between the bottom of said body and the top of said frame when said body is moved to its lowered position that is substantially continuous from the front to the back of said body.

15. In a working area having a plurality of signposts defining distinct regions in said working area, wherein said signposts are associated with a base station for controlling the routing of an individual truck in a fleet of dump-body trucks to and from said distinct regions within said working area and wherein said base station receives data from said trucks and issues commands to said trucks, an apparatus on-board each of said trucks comprising, in combination:
  a weighing means mounted to the frame of said truck for supporting the entire weight of the body of said truck in its lowered position, said weighing means providing data indicative of the weight of said body;
  a sensor mounted to the frame of said truck for detecting said signposts and providing data indicative of the present location of said truck;
  a processor means on-board said truck for (1) receiving said weight and location data, and (2) providing output data indicative of hauling status such as loading or dumping in association with the location of said truck;
  transceiver means on-board said truck for (1) receiving said output data from said processor means and transmitting said output data to said base station for further processing and (2) receiving control data from said base station and delivering said control data to said processor means; and
  said processor means including means responsive to said control data for providing vehicle operating instructions to a truck operator.

16. The apparatus as set forth in claim 15, wherein said means responsive to said control data is an on-board display means responsive to said processor means for visualizing said vehicle-operating instructions.

17. A method for monitoring and controlling the movement of a fleet of material hauling vehicles comprising the steps of:
  distributing a plurality of signposts throughout a working site so that each signpost is associated with a discrete area of said working site;
  detecting on board each vehicle said signposts in order to provide an indication of vehicle location and generating data indicative of said vehicle location;
  sensing on board each vehicle a weight of a load of material carried by said vehicle and generating data indicative of said weight;
  collecting said location and weight data and formulating a historical data base indicative of vehicle performance; and
  generating control data from said historical data base for controlling the movement of at least a selected one of said vehicles in accordance with a predetermined objective.

18. A method as set forth in claim 17 wherein said each vehicle includes a material-carrying body supported on a frame and said weight bearing on said at least one axle is provided by a system including:
  an assembly on said each vehicle including at least two elongated, fluid-filled tubings placed between said frame and said body of said vehicle and aligned end-to-end so as to extend along the length direction of said vehicle;
  at least one sensor associated with each of said fluid-filled tubings for sensing the fluid pressure in said tubing and providing data indicative thereof;
  means for storing values of physical relationships between said at least one axle and said assembly; and
  a processor means responsive to said values stored in said storing means and said data from said at least one sensor for providing an indication of the weight bearing on said at least one axle of said each vehicle.

19. A method as set forth in claim 18 wherein said system includes a means for comprising said indication of the weight bearing on said at least one axle and a predetermined maximum weight and a display responsive to said comparing means for alerting a vehicle operator if the weight bearing on said at least one axle is greater than said predetermined maximum weight.

* * * * *